US011680788B2

(12) United States Patent
Mutlu et al.

(10) Patent No.: US 11,680,788 B2
(45) Date of Patent: *Jun. 20, 2023

(54) HANDLING OBSTRUCTIONS AND TRANSMISSION ELEMENT CONTAMINATION FOR SELF-MIXING PARTICULATE MATTER SENSORS

(71) Applicant: Apple Inc., Cupertino, CA (US)

(72) Inventors: Mehmet Mutlu, San Jose, CA (US); Miaolei Yan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/393,278

(22) Filed: Aug. 3, 2021

(65) Prior Publication Data

US 2021/0364273 A1    Nov. 25, 2021

Related U.S. Application Data

(62) Division of application No. 16/833,271, filed on Mar. 27, 2020, now Pat. No. 11,112,235.
(Continued)

(51) Int. Cl.
*G01B 9/02* (2022.01)
*G01N 15/06* (2006.01)
(Continued)

(52) U.S. Cl.
CPC ..... *G01B 9/02092* (2013.01); *G01B 9/02045* (2013.01); *G01N 15/06* (2013.01);
(Continued)

(58) Field of Classification Search
CPC ............ G01B 9/02092; G01B 9/02045; G01B 9/02004; G01N 15/06; G01N 15/10;
(Continued)

(56) References Cited

U.S. PATENT DOCUMENTS 4,402,601 A    9/1983   Riva
4,657,382 A    4/1987   Busujima et al.
(Continued)

FOREIGN PATENT DOCUMENTS

CN    2163384    4/1994
CN    1279394    1/2001
(Continued)

OTHER PUBLICATIONS

Guiliani et al., "Laser diode self-mixing technique for sensing applications," Journal of Optics A: Pure and Applied Optics, 2002, S283-S294.
(Continued)

*Primary Examiner* — Michael P LaPage
(74) *Attorney, Agent, or Firm* — Brownstein Hyatt Farber Schreck, LLO

(57) ABSTRACT

A portable electronic device is operable in a particulate matter concentration mode where the portable electronic device uses a self-mixing interferometry sensor to emit a beam of coherent light from an optical resonant cavity, receive a reflection or backscatter of the beam into the optical resonant cavity, produce a self-mixing signal resulting from a reflection or backscatter of the beam of coherent light, and determine a particle velocity and/or particulate matter concentration using the self-mixing signal. The portable electronic device is also operable in an absolute distance mode where the portable electronic device determines whether or not an absolute distance determined using the self-mixing signal is outside or within a particulate sensing volume associated with the beam of coherent light. If not, the portable electronic device may determine a contamination and/or obstruction is present that may result in inaccurate particle velocity and/or particulate matter concentration determination.

20 Claims, 22 Drawing Sheets

Related U.S. Application Data

(60) Provisional application No. 62/830,120, filed on Apr. 5, 2019.

(51) Int. Cl.
    *G01N 15/10*     (2006.01)
    *G01S 7/4912*     (2020.01)
    *G01S 17/58*     (2006.01)

(52) U.S. Cl.
    CPC ............ *G01N 15/10* (2013.01); *G01S 7/4916* (2013.01); *G01S 17/58* (2013.01); *G01N 2015/0693* (2013.01); *G01N 2015/1075* (2013.01)

(58) Field of Classification Search
    CPC ... G01N 2015/1075; G01N 2015/0693; G01N 2015/003; G01N 2015/0046; G01N 21/53; G01N 21/45; G01P 5/001; G01P 5/20; G01P 5/26; G01S 7/4916; G01S 17/34; G01S 17/58
    See application file for complete search history.

(56) References Cited

U.S. PATENT DOCUMENTS

| | | |
|---|---|---|
| 5,748,295 A | 5/1998 | Farmer |
| 5,825,465 A | 10/1998 | Nerin et al. |
| 6,233,045 B1 | 5/2001 | Suni et al. |
| 6,794,671 B2 | 9/2004 | Nicoli et al. |
| 7,227,180 B2 | 10/2007 | Townley-Smith et al. |
| 7,388,672 B2 | 6/2008 | Zhou et al. |
| 7,619,744 B2 | 11/2009 | Liess |
| 7,990,521 B2 | 8/2011 | Ueno |
| 7,995,193 B2 | 8/2011 | Kuwata |
| 8,339,584 B2 | 12/2012 | Christian et al. |
| 8,532,751 B2 | 9/2013 | McKenna |
| 8,625,099 B2 | 1/2014 | Sakamoto et al. |
| 8,820,147 B2 | 9/2014 | Sinha |
| 8,982,336 B2 | 3/2015 | Ueno |
| 9,229,024 B2 | 1/2016 | Carpaij et al. |
| 9,354,315 B2 | 5/2016 | Lepaysan et al. |
| 9,726,474 B2 | 8/2017 | Royo Royo et al. |
| 9,759,736 B2 | 9/2017 | Zamama et al. |
| 9,778,177 B2 | 10/2017 | Roke et al. |
| 10,180,397 B2 | 1/2019 | Rakic et al. |
| 10,379,028 B2 | 8/2019 | Spruit et al. |
| 10,390,730 B1 | 8/2019 | Shoeb |
| 10,503,048 B2 | 12/2019 | Del Bino et al. |
| 10,788,308 B2 | 9/2020 | Mutlu et al. |
| 11,054,244 B2 | 7/2021 | Ouweltjes et al. |
| 11,243,068 B1 | 2/2022 | Mutlu et al. |
| 11,409,365 B2 | 8/2022 | Mutlu et al. |
| 11,419,546 B2 | 8/2022 | Cihan et al. |
| 11,450,293 B2 | 10/2022 | Chen et al. |
| 2010/0134803 A1* | 6/2010 | Baier .................... H01S 5/0607 356/450 |
| 2011/0116101 A1* | 5/2011 | Werner .................. G01S 17/50 356/521 |
| 2012/0002189 A1 | 1/2012 | Bengoechea Apezteguia et al. |
| 2013/0033696 A1* | 2/2013 | Ueno ..................... G01S 17/34 356/498 |
| 2016/0320173 A1* | 11/2016 | Royo Royo ......... G01B 9/0207 |
| 2018/0224368 A1* | 8/2018 | Spruit .................... G01N 15/06 |
| 2019/0285537 A1* | 9/2019 | Spruit ................ G01N 15/1434 |
| 2019/0285753 A1 | 9/2019 | Spruit et al. |
| 2019/0346360 A1* | 11/2019 | Jutte .................. G01N 15/0205 |
| 2020/0072723 A1 | 3/2020 | Weiss |
| 2020/0096314 A1* | 3/2020 | Ouweltjes ............. G01S 7/4916 |
| 2020/0292435 A1* | 9/2020 | Spruit ................ G01N 15/1459 |
| 2020/0318945 A1 | 10/2020 | Mutlu et al. |
| 2020/0319082 A1 | 10/2020 | Mutlu et al. |
| 2020/0337631 A1 | 10/2020 | Sahin |
| 2020/0350744 A1 | 11/2020 | Gertach |
| 2020/0370879 A1 | 11/2020 | Mutlu et al. |
| 2021/0010797 A1 | 1/2021 | Cihan et al. |
| 2021/0080248 A1 | 3/2021 | Cihan et al. |
| 2021/0302745 A1 | 9/2021 | Mutlu et al. |
| 2022/0099431 A1 | 3/2022 | Chen et al. |

FOREIGN PATENT DOCUMENTS

| | | |
|---|---|---|
| CN | 1682105 | 10/2005 |
| CN | 102564909 | 7/2012 |
| CN | 103733061 | 4/2014 |
| CN | 106226783 | 12/2016 |
| CN | 207231962 | 4/2018 |
| CN | 109154659 | 1/2019 |
| CN | 108692663 | 4/2020 |
| DE | 102016210830 | 12/2017 |
| EP | 3514898 | 7/2019 |
| JP | H06331745 | 12/1994 |
| WO | WO 10/058322 | 5/2010 |
| WO | WO 14/086375 | 6/2014 |
| WO | WO 17/198699 | 11/2017 |
| WO | WO 18/104153 | 6/2018 |
| WO | WO 18/104154 | 6/2018 |
| WO | WO 18/206474 | 11/2018 |
| WO | WO 20/207908 | 10/2020 |
| WO | WO 21/257737 | 12/2021 |

OTHER PUBLICATIONS

Author Unknown, "Biometric Technology Market Foresees Growth Due to Innovative Advancement," https://menafn.com/mf_contact.aspx?src=Contact_Authors, Dec. 18, 2020, 2 pages.

* cited by examiner

HANDLING OBSTRUCTIONS AND TRANSMISSION ELEMENT CONTAMINATION FOR SELF-MIXING PARTICULATE MATTER SENSORS

CROSS-REFERENCE TO RELATED APPLICATIONS

This application is a division of U.S. patent application Ser. No. 16/833,271, filed Mar. 27, 2020, which is a nonprovisional of, and claims the benefit under 35 U.S.C. § 119(e) of, U.S. Provisional Patent Application No. 62/830,120, filed Apr. 5, 2019, the contents of which are hereby incorporated by reference as if fully disclosed herein.

FIELD

The described embodiments relate generally to sensor technology. More particularly, the present embodiments relate to detecting and handling obstructions and transmission element contamination for self-mixing particulate matter sensors.

BACKGROUND

There are many different kinds of electronic devices. Examples of electronic devices include desktop computing devices, laptop computing devices, mobile computing devices, smart phones, tablet computing devices, wearable devices, electronic kitchen appliances, digital media players, and so on. Such electronic devices may include buttons, switches, touch input surfaces, and/or other components.

Increasingly, electronic devices are equipped with one or more environmental and/or other sensors. Examples of such sensors include one or more pressure sensors, temperature sensors, humidity sensors, gas sensors, and particulate matter sensors.

Particulate matter sensing and measurement may be employed in environmental and/or other applications, such as air quality monitoring and management. Particulate matter may contain a mixture of solid particles and/or liquid droplets suspended in the air. According to the World Health Organization, particulate matter is the most dominant outdoor air pollutant in the world. Particulate matter may have a variety of adverse health effects, such as causing respiratory and/or cardiovascular irritations and/or diseases, even cancer. Smaller particles in particular, such as PM10 (less than approximately 10 microns in diameter) and/or PM2.5 (less than approximately 2.5 microns in diameter), may penetrate deep into the respiratory system and may be even more harmful to the human population than larger particles.

SUMMARY

The present disclosure relates to a wavelength-modulation technique that detects the presence of contamination and/or obstructions that may cause inaccurate particle velocity and/or particulate matter concentration estimation. A portable electronic device is operable in a particulate matter concentration mode where the portable electronic device uses a self-mixing interferometry sensor to emit a beam of coherent light from an optical resonant cavity, receive a reflection or backscatter of the beam into the optical resonant cavity, produce a self-mixing signal resulting from a reflection or backscatter of the beam of coherent light, and determine a particle velocity and/or particulate matter concentration using the self-mixing signal. The portable electronic device is also operable in an absolute distance mode where the portable electronic device determines whether or not an absolute distance determined using the self-mixing signal is outside or within a particulate sensing volume associated with the beam of coherent light. If the absolute distance determined is outside the particulate sensing volume, the portable electronic device may determine a contamination and/or obstruction is present, discard and/or re-determine an associated particle velocity and/or particulate matter concentration determination, instruct removal of the contamination and/or obstruction, wait to determine particle velocity and/or particulate matter concentration until the contamination and/or obstruction is gone, and so on. As a result, inaccurate particle velocity and/or particulate matter concentration data may not be reported and/or used.

In various embodiments, a portable electronic device that senses particulate matter includes at least one optically transparent material; at least one optical element; a self-mixing interferometry sensor configured to emit a beam of coherent light from an optical resonant cavity through the at least one optically transparent material via the at least one optical element to illuminate an object, receive a reflection or backscatter of the beam into the optical resonant cavity, and produce a self-mixing signal resulting from self-mixing of the coherent light within the optical resonant cavity; and a processor. The processor is configured to determine a particle velocity using the self-mixing signal, determine a particulate matter concentration using the particle velocity and a particle count, determine an absolute distance to the object using the self-mixing signal, and determine whether the particulate matter concentration is accurate by determining if the absolute distance corresponds to an inside or an outside of a sensing volume associated with the beam of coherent light for the relevant particulate matter size range (e.g., PM2.5).

In some examples, the processor determines the particle velocity using a first self-mixing signal measured from a first beam of coherent light and a second self-mixing signal measured from a second beam of coherent light. In various implementations of such examples, the processor determines the particle velocity using a known angle between the first beam of coherent light and the second beam of coherent light. In a number of such examples, the self-mixing interferometry sensor includes a first vertical-cavity surface-emitting laser and a second vertical-cavity surface-emitting laser, the first vertical-cavity surface-emitting laser emits the first beam of coherent light, and the second vertical-cavity surface-emitting laser emits the second beam of coherent light. In some implementations of such examples, the self-mixing interferometry sensor is a single vertical-cavity surface-emitting laser and the at least one optical element splits the beam of coherent light into the first beam of coherent light and the second beam of coherent light.

In various examples, the at least one optical element focuses the beam of coherent light at a location corresponding to the sensing volume. In a number of examples, the processor discards the particulate matter concentration upon determining the particulate matter concentration is inaccurate.

In some embodiments, a portable electronic device that senses particulate matter includes a self-mixing interferometry sensor configured to emit a beam of coherent light from an optical resonant cavity, receive a reflection or backscatter of the beam into the optical resonant cavity, and produce a self-mixing signal resulting from self-mixing of the coherent light within the optical resonant cavity; and a processor. The processor is configured to determine, using the self-mixing signal, an absolute distance to an object causing the reflection or the backscatter of the beam of coherent light and when the absolute distance is within a predetermined sensing volume, determine a particle velocity using the self-mixing signal.

In some examples, the portable electronic device may use the self-mixing interferometry sensor to perform an absolute distance measurement every second (or other periodic or non-periodic interval). If the portable electronic device detects that the absolute distance (determined with a sufficiently high signal-to-noise ratio) is outside the predetermined sensing volume, the portable electronic device may discard the data collected during the last second (or other interval).

In various examples, the processor waits a period of time before determining the particle velocity when the absolute distance is outside the predetermined sensing volume. In a number of examples, the processor determines that the particle velocity cannot be determined when the absolute distance is outside the predetermined sensing volume. In some examples, the processor makes a series of absolute distance determinations when the absolute distance is outside the predetermined sensing volume and waits until one of the series of absolute distance determinations is within the predetermined sensing volume or cannot be determined before determining the particle velocity. In various examples, the processor determines the absolute distance based on a modulation of the beam of coherent light. In some examples, when the absolute distance is outside the predetermined sensing volume, the processor determines a particle velocity using the self-mixing signal and signals an inaccuracy in the particle velocity. In various examples, the self-mixing interferometry sensor is at least one vertical-cavity surface-emitting laser optically coupled with a photodetector.

In a number of embodiments, a portable electronic device that senses particulate matter includes a self-mixing interferometry sensor configured to emit a beam of coherent light from an optical resonant cavity, receive a reflection or backscatter of the beam into the optical resonant cavity, and produce a self-mixing signal resulting from self-mixing of the coherent light within the optical resonant cavity; and a processor. The processor is configured to operate in a particulate matter concentration determination mode by determining a particle velocity using the self-mixing signal and operate in an absolute distance mode by determining an absolute distance using the self-mixing signal; when the absolute distance is less than a sensing volume associated with the beam of coherent light for the relevant particulate matter size range (e.g., PM2.5), determining a contamination is present on an optically transparent material; and when the absolute distance is greater than the associated sensing volume, determining an obstruction is present in the beam of coherent light.

In some examples, the absolute distance is a first absolute distance and the processor determines a second absolute distance after determining the contamination or the obstruction. In various examples, the processor outputs a notification to clean the optically transparent material after determining the contamination is present. In some implementations of such examples, the absolute distance is a first absolute distance, the processor determines a second absolute distance, and the processor switches to the particulate matter concentration determination mode when the second absolute distance is within the sensing volume (if there is a particle at the time of measurement) or measurement of the second absolute distance no longer indicates the presence of the contamination or the obstruction (if there is no particle at the time of measurement).

For example, the processor may measure absolute distance every second (or other periodic or non-periodic interval). The contamination or the obstruction may be slow (present on a millisecond to second scale). As such, the processor may be likely to measure the absolute distance of the contamination of the obstruction, if present. When the measurement of absolute distance indicates that the absolute distance is not within the sensing volume, the processor may discard data recorded in that second (or other interval).

In a number of examples, the processor outputs a notification to remove the obstruction upon determining the obstruction. In various examples, the processor switches to the particulate matter concentration determination mode after the obstruction is removed.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
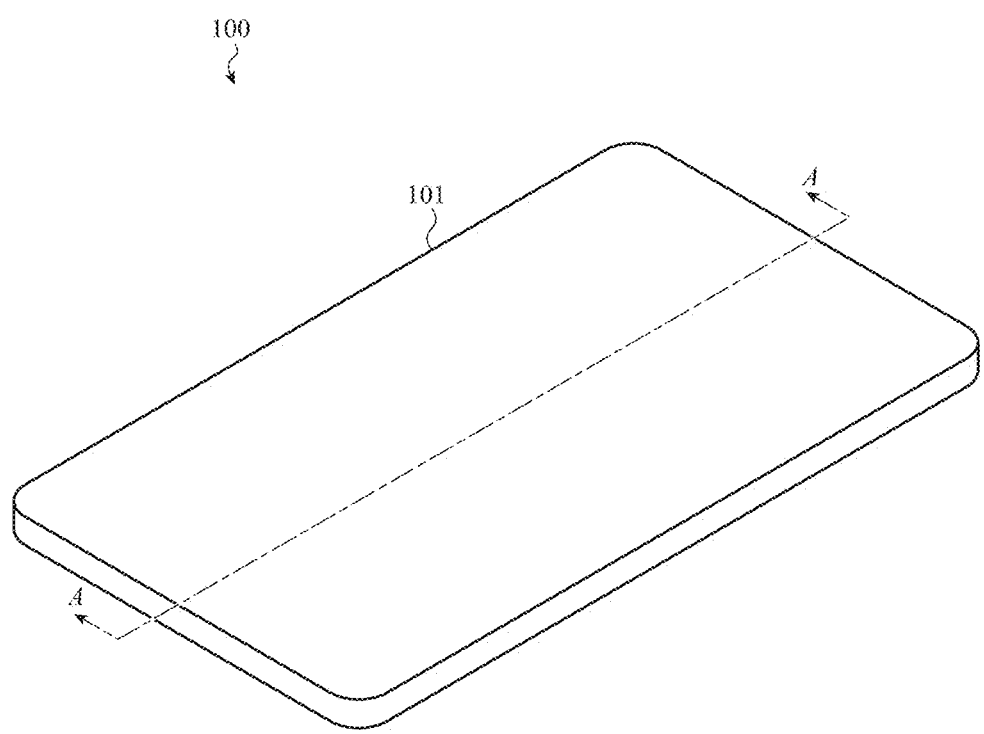
FIG. 1 depicts an example electronic device that may detect and/or handle one or more obstructions and/or transmission element contamination for one or more self-mixing particulate matter sensors.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

In self-mixing interferometry, one or more beams of coherent light emitted by one or more stimulated emission sources (such as one or more lasers or other coherent light sources) may be reflected or backscattered from an object and recoupled into the resonant cavity of the light source that emitted the coherent light. This recoupling may modify one or more interferometric parameters, such as a measurable phase-sensitive change in the resonant cavity electric field, carrier distribution, and/or other changes in the gain profile, lasing threshold, and so on of a laser to create a measurable change in the voltage on the laser junction (if the laser is being driven with a current source), a bias current on the laser (if the laser is being driven with a voltage source), and/or the optical power emitted by the laser.

Self-mixing interferometers may be used to measure particulate matter concentration by detecting particles in a gas that scatter coherent light. Using the self-mixing signal measured by detecting modifications to the interferometric parameters caused by the recoupling of reflected or backscattered light, particles may be detected and the velocities of the particles may be determined using corresponding Doppler frequencies. Air flow may be determined based on the particle velocities and particulate matter concentration may be determined or estimated based on the particle count and the air flow.

Given that particulate matter may be microscopic, PM10 (less than approximately 10 microns in diameter) and/or PM2.5 (less than approximately 2.5 microns in diameter), the amount of reflected or backscattered light from particulate matter into a cavity may be extremely small. In order to detect this reflected or backscattered light, optical elements (such as refractive, diffractive, holographic, or sub-wavelength beam-shaping optics) may be used to focus emitted coherent light to a diffraction-limited or near diffraction-limited location that functions as a "sensing volume."

Determining or estimating particulate matter concentration in this way may involve accurate estimation of particle velocity. Generally, when air flow control elements (such as one or more fans, pumps, and so on) are not used, particles may be free to move in three dimensions. As such, multiple coherent light sources and/or coherent light beams may be used to estimate particle velocity. In such implementations, the angle between the various beams may need to be precisely known to facilitate accurate particle velocity estimation.

Beam shaping optics may generally perform satisfactorily and create tightly focused beams with precisely controlled angles. This may facilitate accurate particle velocity estimation and thus particulate matter concentration estimation. However, a beam may be transmitted through a transmission element (such as one or more optically transparent materials like a cover glass, plastic layer, and so on and/or one or more optical elements like a lens and so on. Contamination on such an optically transparent material (such as water, sweat, skin oil and/or other oil, fingerprints, dirt, dust, smudges, and so on) may disrupt the tight focus of the beam due to refraction and scattering. This may lead to a strongly reduced sensitivity for particulate matter detection. Further, such contamination may change the direction of the beam and thus create inaccuracies in particle velocity estimation. Such contamination may cause inaccuracies up to 400% or more.

Moreover, macroscopic obstructions in the beam path (such as a hand, face, wall, tabletop, and so on) may also result in inaccurate particle velocity and/or particulate matter concentration estimation. These obstructions may generate self-mixing interferometry signals that may not be distinguished from the self-mixing interferometry signals generated by particulate matter. As a result, inaccurate particle velocity and/or particulate matter concentration may be estimated.

The following disclosure relates to a wavelength-modulation technique that detects the presence of contamination and/or obstructions that may cause inaccurate particle velocity and/or particulate matter concentration estimation. A portable electronic device is operable in a particulate matter concentration mode where the portable electronic device uses a self-mixing interferometry sensor to emit a beam of coherent light from an optical resonant cavity, receive a reflection or backscatter of the beam into the optical resonant cavity, produce a self-mixing signal (or interference signal) resulting from a reflection or backscattering of the beam of coherent light, and determine a particle velocity and/or particulate matter concentration using the self-mixing signal. The portable electronic device is also operable in an absolute distance mode where the portable electronic device determines whether or not an absolute distance determined using the self-mixing signal is outside or within a particulate sensing volume associated with the beam of coherent light. If the absolute distance determined is outside the particulate sensing volume, the portable electronic device may determine a contamination and/or obstruction is present, discard and/or re-determine an associated particle velocity and/or particulate matter concentration determination, instruct removal of the contamination and/or obstruction, wait to determine particle velocity and/or particulate matter concentration until the contamination and/or obstruction is gone, and so on. As a result, inaccurate particle velocity and/or particulate matter concentration data may not be reported and/or used.

These and other embodiments are discussed below with reference to FIGS. 1-8E. However, those skilled in the art will readily appreciate that the detailed description given herein with respect to these Figures is for explanatory purposes only and should not be construed as limiting.

FIG. 1 depicts an example electronic device 100 that may detect and/or handle one or more obstructions and/or transmission element contamination for one or more self-mixing particulate matter sensors. The electronic device 100 includes a cover glass 101 and/or other transmission element through which one or more coherent light beams and/or reflection or backscatter of such coherent light beams associated with one or more self-mixing particulate matter sensors may pass.

The electronic device 100 is illustrated as a portable electronic device. However, it is understood that this is an example. In various implementations, the electronic device 100 may be any kind of device without departing from the scope of the present disclosure. Examples of such devices may include mobile computing devices, desktop computing devices, wearable devices, laptop computing devices, smart phones, tablet computing devices, kitchen appliances, sensors, displays, and so on. Various configurations are possible and contemplated without departing from the scope of the present disclosure.

Figure 2A:
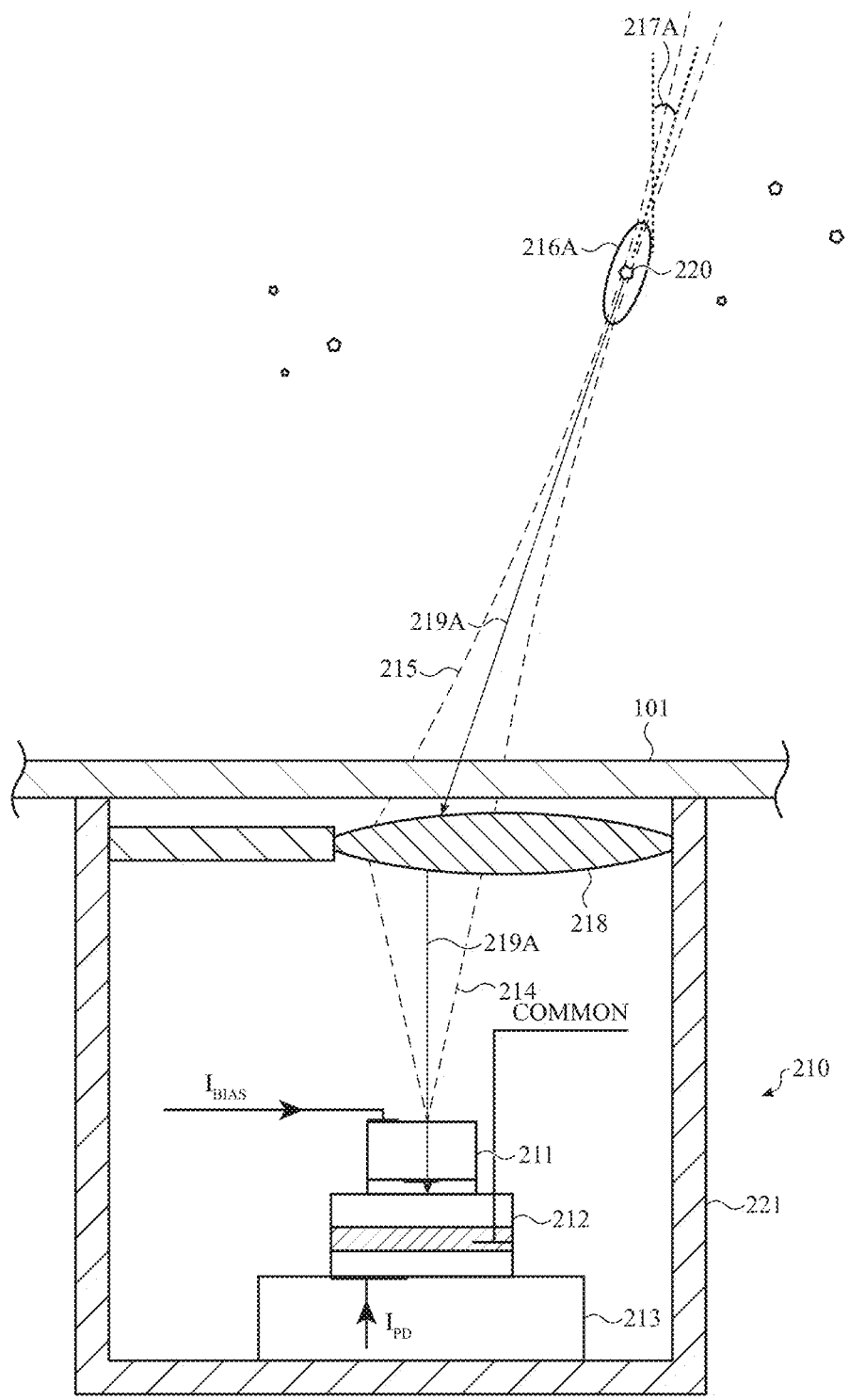
FIG. 2A depicts a partial cross section of the example electronic device of FIG. 1, illustrating an example particulate matter sensor, taken along line A-A of FIG. 1.

FIG. 2A depicts a partial cross section of the example electronic device 100 of FIG. 1, illustrating an example particulate matter sensor 210, taken along line A-A of FIG. 1. The example particulate matter sensor 210 may include a self-mixing interferometry sensor constructed of a vertical-cavity surface-emitting laser 211 (VCSEL) or other light source and a photodetector 212 (such as a photodiode and/or other type of photodetector). The VCSEL 211 and photodetector 212 may be integrated and mounted on a substrate 213. The example particulate matter sensor 210 may include a lens 218 and/or other refractive, diffractive, holographic, or sub-wavelength beam-shaping or other optical element and a housing 221 that positions the lens 218 and the VCSEL 211 with respect to the cover glass 101. The VCSEL 211 may be operative to emit a beam of coherent light 214 (such as from an optical resonant cavity) that passes through the lens 218 as a focused beam 215, passing through the cover glass 101, that is focused on a sensing volume 216A (or predetermined sensing volume). The focused beam 215 may have a tilt 217A. A particle 220 in the sensing volume 216A may cause reflected or backscattered light 219A from the focused beam 215. This reflected or backscattered light 219A may travel through the cover glass 101 and/or the lens 218 to the integrated VCSEL 211 and photodetector 212 (such as to the optical resonant cavity). A self-mixing signal detected by the integrated VCSEL 211 and photodetector 212 as a result of the reflected or backscattered light 219A (such as in the optical resonant cavity) may be used to detect the particle 220, estimate or determine a velocity of the particle 220, estimate or determine a particulate matter concentration using the particle velocity, and so on.

Although FIG. 2A illustrates and describes a single VCSEL 211 and a single beam of coherent light 214, it is understood that this is an example for the purposes of clarity. Accurate determination or estimation of particle velocity in multiple directions (and thus determination or estimation of particulate matter concentration) may not be possible without multiple beams and/or light sources. As such, in various implementations, the example particulate matter sensor 210 may use one or more other beams and/or light sources without departing from the scope of the present disclosure. In implementations using more than one beam, the beams may be arranged in an orthogonal or non-orthogonal fashion depending on the optical design.

Regardless, various contamination on the cover glass 101 and/or obstructions in the focused beam 215 may interfere with determination or estimation of particle velocity and/or particulate matter concentration. Such contamination or obstruction may modify the sensing volume 216A, alter the tilt 217A, reflect or backscatter additional portions of the focused beam 215, and so on. One or more of these may result in inaccurate determination or estimation of particle velocity and/or particulate matter concentration.

Sensing volumes may typically be extremely small, such as approximately 0.005 millimeters cubed. If an absolute distance to an object generating the self-mixing signal is determined to be outside the sensing volume, presence of a contamination or obstruction may be determined.

Figure 2B:
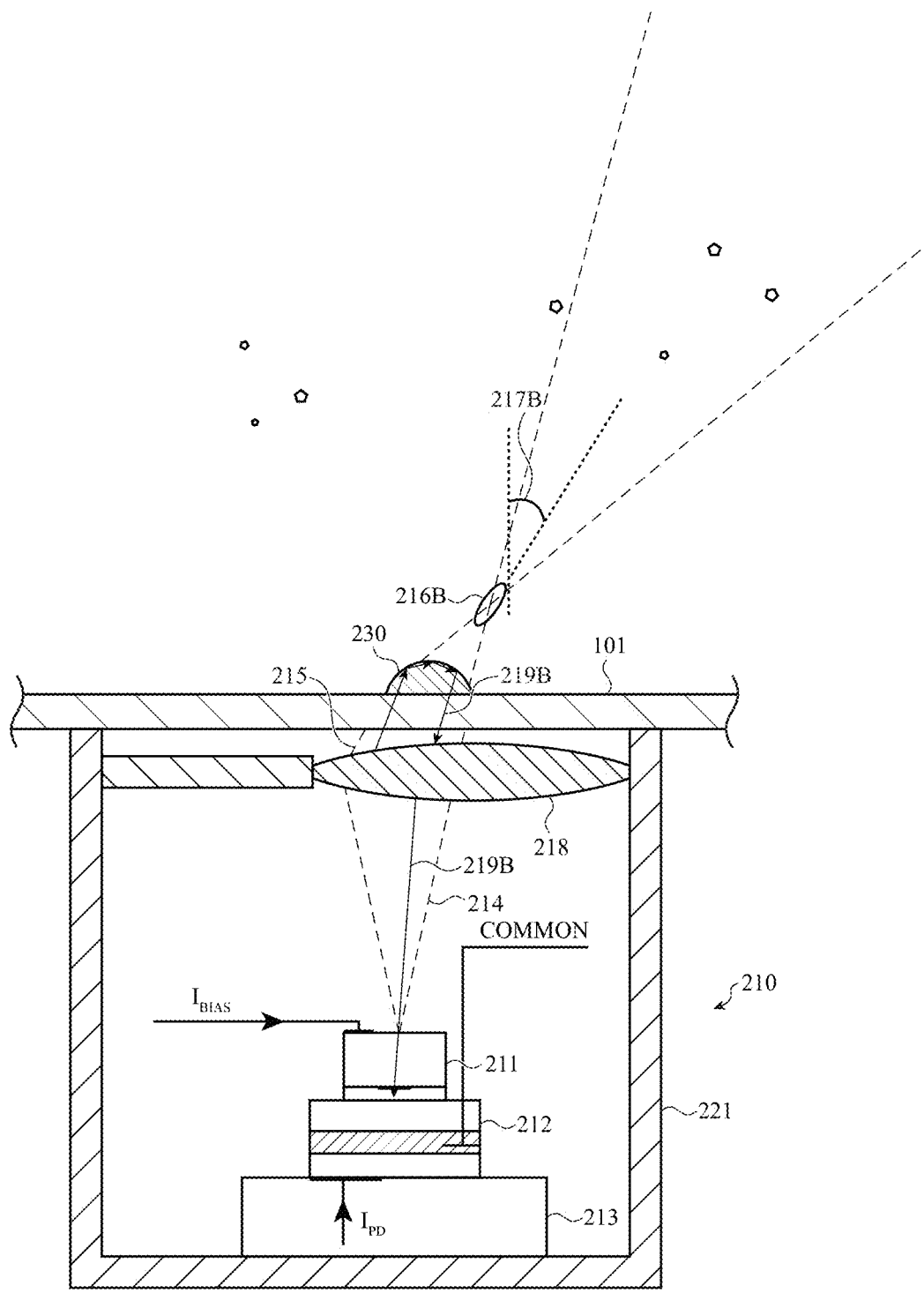
FIG. 2B depicts the example particulate matter sensor of FIG. 2A with an example transmission element contamination.

FIG. 2B depicts the example particulate matter sensor 210 of FIG. 2A with an example transmission element contamination 230. In this example, the contamination 230 is shown as a spherical section of oil. However, it is understood that this is an example. Contaminations may be a variety of different shapes, sizes, and materials (such as water, sweat, skin oil and/or other oil, fingerprints, dirt, dust, smudges, and so on).

Regardless, the presence of the contamination 230 on the cover glass 101 may modify the sensing volume 216B and/or the tilt 217B, strongly in some cases. The presence of the contamination 230 on the cover glass 101 may also cause reflected or backscattered light 219B into the cavity of the VCSEL 211 through total internal reflection and/or refraction. Thus, a self-mixing signal may be measured even though there is no particle to detect. As such, the presence of the contamination 230 on the cover glass 101 may result in false detection of particles and/or inaccurate determination or estimation of particle velocity and/or particulate matter concentration.

However, the example particulate matter sensor 210 may be used in a particulate matter concentration determination mode and an absolute distance mode. The example particulate matter sensor 210 may be used to determine or estimate particle velocity and/or particulate matter concentration in a particulate matter concentration determination mode and presence of the contamination 230 using a wavelength modulation-based frequency-domain analysis techniques in the absolute distance mode. The example particulate matter sensor 210 and/or related devices or components may inform a user about detection of the contamination 230 (such as instructing the user to clean the cover glass 101), discard one or more determinations or estimations, and/or otherwise respond accordingly.

For example, if a sensing volume associated with the focused beam 215 is located 4 mm from the VCSEL 211 and the absolute distance indicates the absolute distance is 1 mm, it may be determined that a contamination is present on the cover glass 101. Actions may be taken accordingly.

Figure 2C:
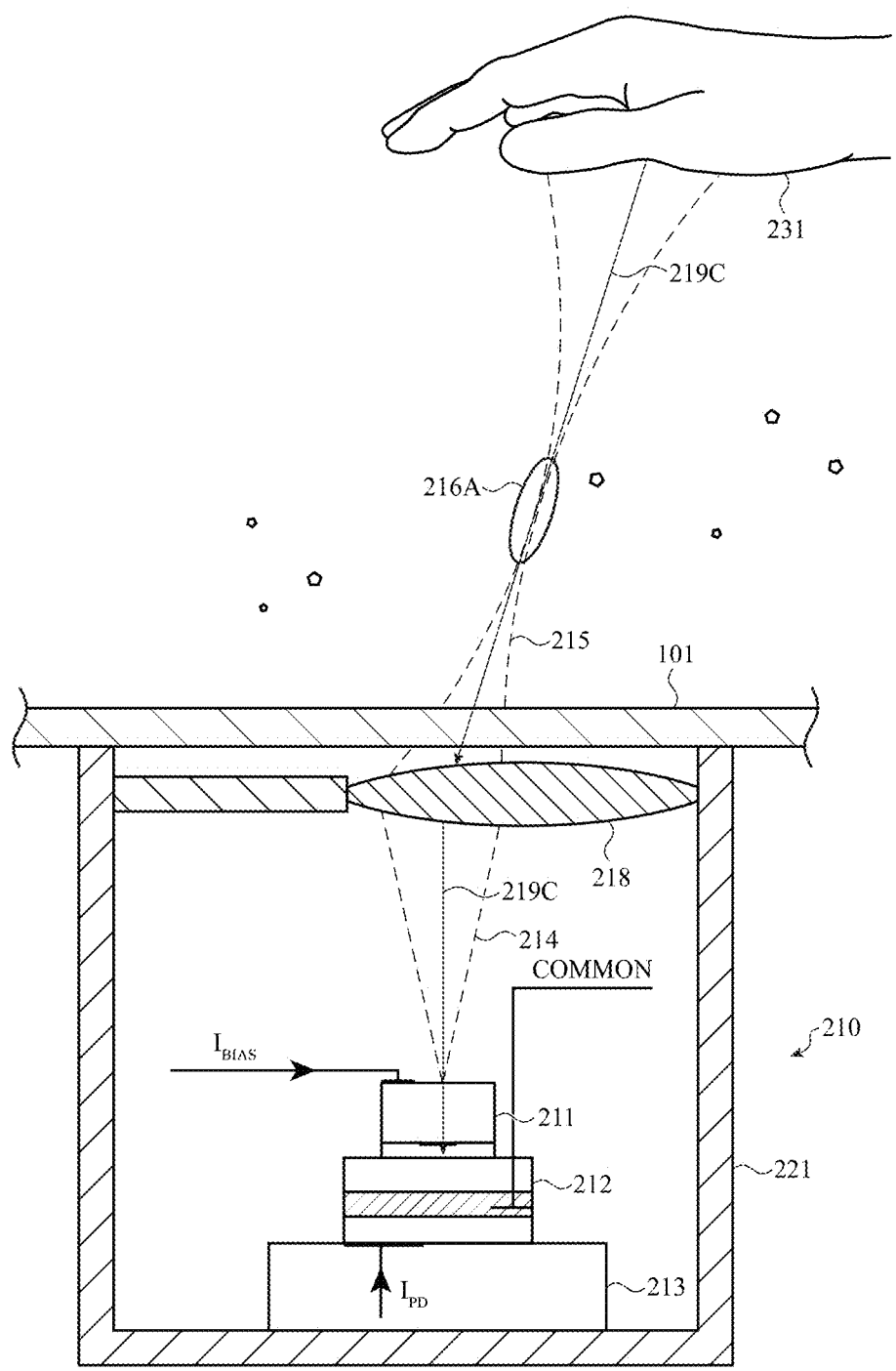
FIG. 2C depicts the example particulate matter sensor of FIG. 2A with an example obstruction.

FIG. 2C depicts the example particulate matter sensor 210 of FIG. 2A with an example obstruction 231. In this example, the obstruction 231 is shown as a hand. However, it is understood that this is an example. Obstructions may be a variety of different shapes, sizes, and objects (such as a hand, face, wall, tabletop, and so on).

Regardless, the presence of a non-stationary (i.e., moving) macroscopic obstruction like the obstruction 231 within the path of the focused beam 215 may cause generated reflected or backscattered light 219C, generating a self-mixing signal that is indistinguishable from one generated by a particle within the sensing volume 216A. Thus, the example particulate matter sensor 210 may report an inaccurate particle detection, particle velocity, and/or particulate matter concentration estimate.

However, in the absolute distance mode, the example particulate matter sensor 210 may determine that the absolute distance is greater than the sensing volume 216A (such as where a sensing volume associated with the focused beam 215 is located 1 mm from the VCSEL 211 and the absolute distance indicates the absolute distance is 10 mm). As such, it may be determined that the obstruction 231 is present. The example particulate matter sensor 210 and/or related devices or components may inform a user about detection of the obstruction 231 (such as instructing the user to remove the obstruction 231), discard one or more determinations or estimations, and/or otherwise respond accordingly.

Figure 3:
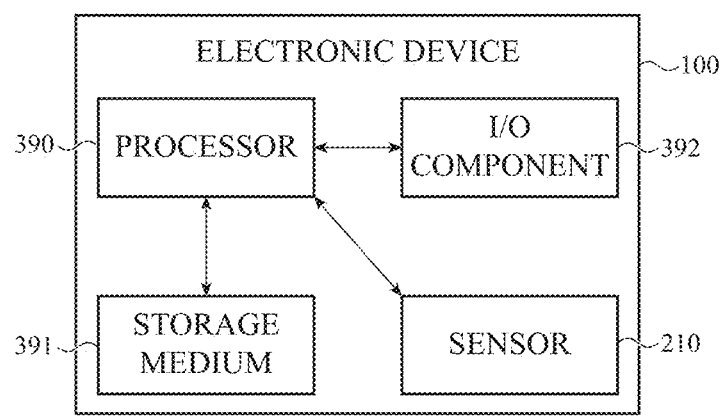
FIG. 3 depicts example functional relationships among example components that may be used to implement the example electronic device of FIG. 1.

FIG. 3 depicts example functional relationships among example components that may be used to implement the example electronic device 100 of FIG. 1. The electronic device 100 may include one or more processors 390, one or more non-transitory storage media 391 (which may take the form of, but is not limited to, a magnetic storage medium; optical storage medium; magneto-optical storage medium; read only memory; random access memory; erasable programmable memory; flash memory; and so on), a particulate matter sensor 210 and/or one or more other sensors, one or more input/output components (such as one or more displays, buttons, touch screens, touch pads, computer mice, track pads, keyboards, virtual keyboards, printers, microphones, speakers, and so on), and so on. The processor 390 may execute one or more instructions stored in the non-transitory storage medium 391 to perform various functions, such as using the particulate matter sensor 210, operating in a particulate matter concentration determination mode, operating in an absolute distance mode, instructing a user using the input/output component 392, and so on.

The processor 390 may switch between particulate matter concentration determination mode and absolute distance mode (and/or other modes) under a variety of different conditions or circumstances. For example, the processor 390 may operate in the absolute distance mode prior to making any determinations or estimations in the particulate matter concentration mode any time the particulate matter sensor 210 outputs data to ensure that any determinations or estimations will be accurate before performing them. By way of another example, the processor 390 may switch from the particulate matter concentration mode to the absolute distance mode after determining or estimating a particle velocity and/or particulate matter concentration in order to ensure that such determinations or estimations are accurate. In another example, the processor 390 may switch to the absolute distance mode after a period of operating in the particulate matter concentration mode, such as once per second, minute, hour, day, and so on. In still another example, the processor 390 may switch to the absolute distance mode if a determination or estimation of particle velocity and/or particulate matter concentration deviates more than a certain amount from previous determinations or estimations (such as a change of more than 2 micrograms per cubic meter from a previous particulate matter concentration determination or estimation). In yet other examples, the processor 390 may switch modes upon user and/or other request, upon determination or estimation of a high particulate matter concentration (such as more than 100 micrograms per cubic meter), and/or upon the occurrence of a variety of other conditions. In yet other examples, the processor 390 may measure absolute distance automatically upon detection that the electronic device 100 moves (such as using an inertial measurement unit) as an obstruction may be possible during movement.

Figure 4:
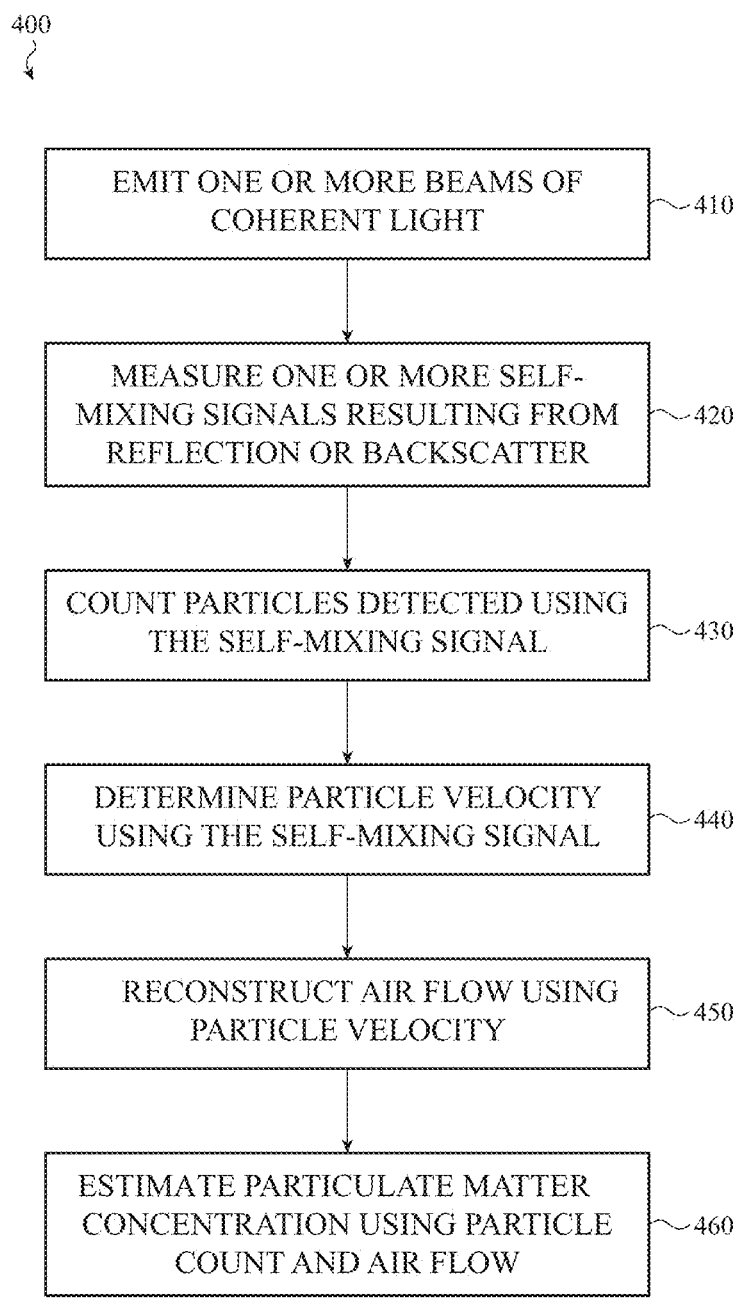
FIG. 4 depicts a flow chart illustrating an example method for determining particulate matter concentration. This example method may be performed by an electronic device, such as the electronic device illustrated in FIGS. 1-3.

FIG. 4 depicts a flow chart illustrating an example method 400 for determining particulate matter concentration. This example method 400 may be performed by an electronic device, such as the electronic device 100 illustrated in FIGS. 1-3.

At 410, the electronic device may emit one or more beams of coherent light. For example, the electronic device may use a VCSEL to emit a laser beam through a cover glass. At 420, the electronic device may measure one or more self-mixing signals resulting from reflection or backscatter of the one or more beams of coherent light. For example, the electronic device may use a photodetector (such as a photodiode and/or other type of photodetector) to measure the change of self-mixing parameters in response to a reflection.

At 430, the electronic device may count particles detected using the self-mixing signal. At 440, the electronic device may determine particle velocity in one or more directions using the self-mixing signal. At 450, the electronic device may reconstruct an air flow using the particle velocity. At 460, the electronic device may estimate a particulate matter concentration using the particle count and the air flow.

In converting to particulate matter concentration, the electronic device may assume a certain particle distribution and a certain mass density. Without making these assumptions, conversion from particle count per volume to particle mass per volume may not be possible.

The method 400 is an example. Examples of determination and/or estimation of particle velocities and/or particulate matter concentrations are discussed in more detail below.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described as counting particles and determining a particle velocity and a particulate matter concentration. However, it is understood that this is an example. In some implementations, these may be estimations instead of counts and/or determinations. Various configurations are possible and contemplated without departing from the scope of the present disclosure.

By way of another example, the method 400 is illustrated and described as determining an air flow and a particulate matter concentration. However, in some implementations, the particle velocity may be determined without determining air flow and/or particulate matter concentration. Various configurations are possible and contemplated without departing from the scope of the present disclosure.

Figure 5A:
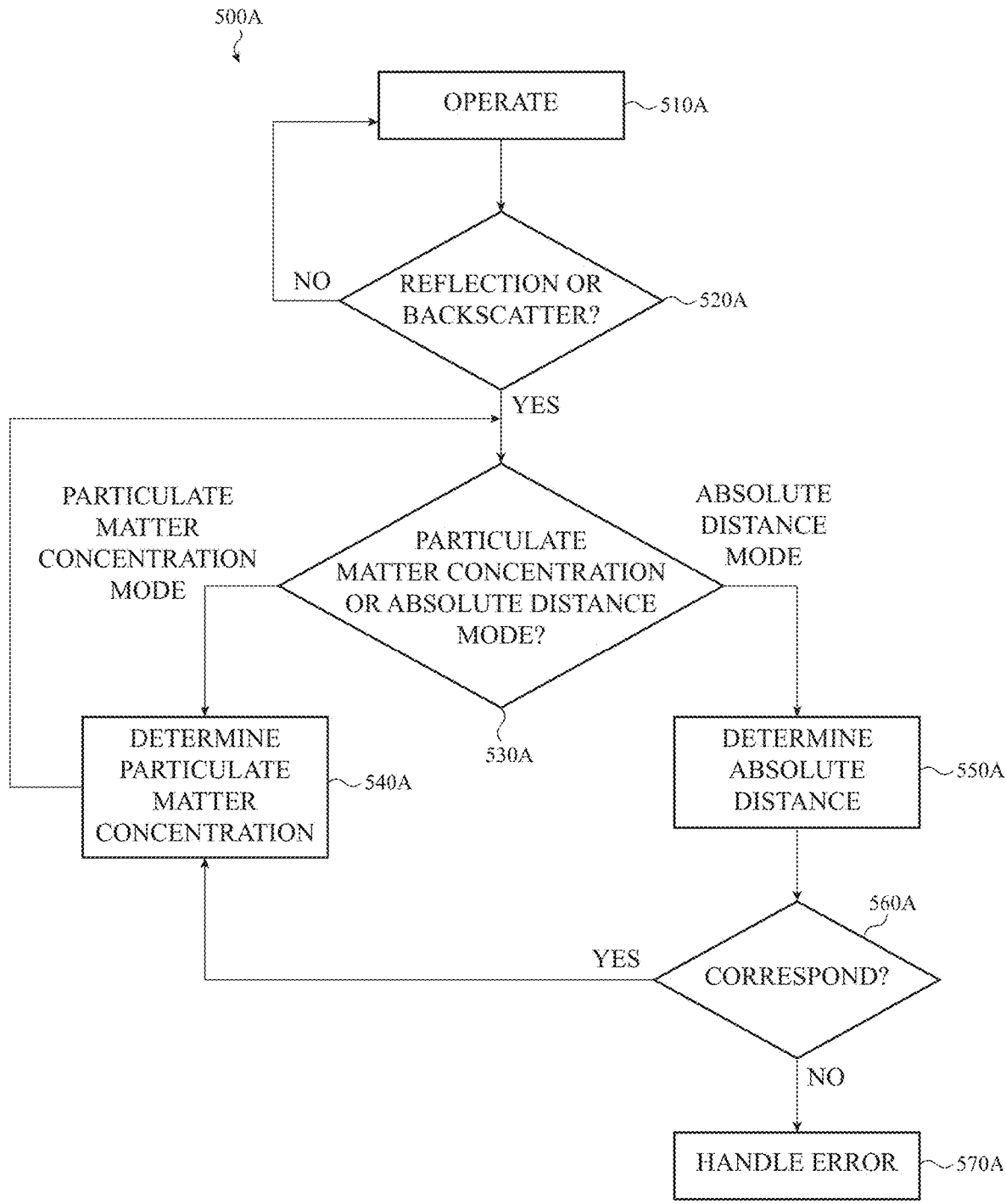
FIG. 5A depicts a flow chart illustrating a first example method for detecting and/or handling one or more obstructions and/or transmission element contamination for one or more self-mixing particulate matter sensors. This example method may be performed by an electronic device, such as the electronic device illustrated in FIGS. 1-3.

FIG. 5A depicts a flow chart illustrating a first example method 500A for detecting and/or handling one or more obstructions and/or transmission element contamination for one or more self-mixing particulate matter sensors. This example method 500A may be performed by an electronic device, such as the electronic device 100 illustrated in FIGS. 1-3.

At 510A, an electronic device may operate. For example, the electronic device may cause one or more coherent light sources to emit one or more beams of coherent light. At 520A, the electronic device may determine whether or not reflection or backscatter from the one or more coherent light sources is detected. For example, the electronic device may use one or more photodetectors (such as one or more photodiodes and/or other types of photodetectors) to detect reflection or backscatter resulting from one or more particles and/or other objects in sensing volumes of the one or more beams and/or otherwise in the paths of the one or more beams. If not, the flow may return to 510A where the electronic device may continue to operate. Otherwise, the flow may proceed to 530A.

At 530A, the electronic device may determine whether to operate in a particulate matter concentration mode or an absolute distance mode. If the electronic device determines to operate in a particulate matter concentration mode, the flow may proceed to 540A where the electronic device may use the reflection or backscatter to determine a particulate matter concentration. The flow may then return to 530A where the electronic device re-determines whether to operate in a particulate matter concentration mode or an absolute distance mode (such as to switch to the absolute distance mode to verify that a determined particulate matter concentration is accurate).

At 550A, after the electronic device determines to operate in the absolute distance mode, the electronic device may use the reflection or backscatter to determine an absolute distance to the object that caused the reflection or backscatter. Use of reflection or backscatter to determine an absolute distance will be discussed in more detail below.

The flow may then proceed to 560A where the electronic device may determine whether or not the absolute distance corresponds to one or more sensing volumes associated with one or more coherent light beams. If so or, in a case where the particle has already passed through the sensing volume, if a target is not found to be present in the beam path for a predetermined amount of time, the flow may proceed to 540A where the electronic device may use the reflection or backscatter to determine a particulate matter concentration. Otherwise, the electronic device may determine that an error has occurred (such as a contamination on a transmission element through which one or more beams of coherent light are transmitted, and obstruction in one or more paths of one or more beams of coherent light, and so on) and the flow may proceed to 570A where the electronic device may handle the error (such as discarding data regarding the reflection or backscatter, outputting notifications regarding one or more contaminations and/or obstructions, instructing a user to clean a transmission element, instructing a user to remove an obstruction, waiting for an obstruction to be removed, and so on).

Although the example method 500A is illustrated and described as including particular operations performed in a particular order, it is understood that this is an example. In various implementations, various orders of the same, similar, and/or different operations may be performed without departing from the scope of the present disclosure.

For example, the method 500A is illustrated and described as determining whether to operate in a particulate matter concentration mode or an absolute distance mode after determining a particulate matter concentration. However, in some implementations, the electronic device may instead return to 520A after 540A in order to first determine whether or not the reflection or backscatter is still detected. Various configurations are possible and contemplated without departing from the scope of the present disclosure.

Further, the method 500A is an event-driven approach. Alternatively, an electronic device may attempt to measure absolute distance at certain intervals and determine if there is anything that does not correspond to the sensing volume. For example, the electronic device may measure absolute distance every second (or other periodic or non-periodic interval). The contamination or the obstruction may be slow (present on a millisecond to second scale). As such, the electronic device may be likely to measure the absolute distance of the contamination of the obstruction, if present. When the measurement of absolute distance indicates that the absolute distance is not within the sensing volume, the electronic device may discard data recorded in that second (or other interval).

Figure 5B:
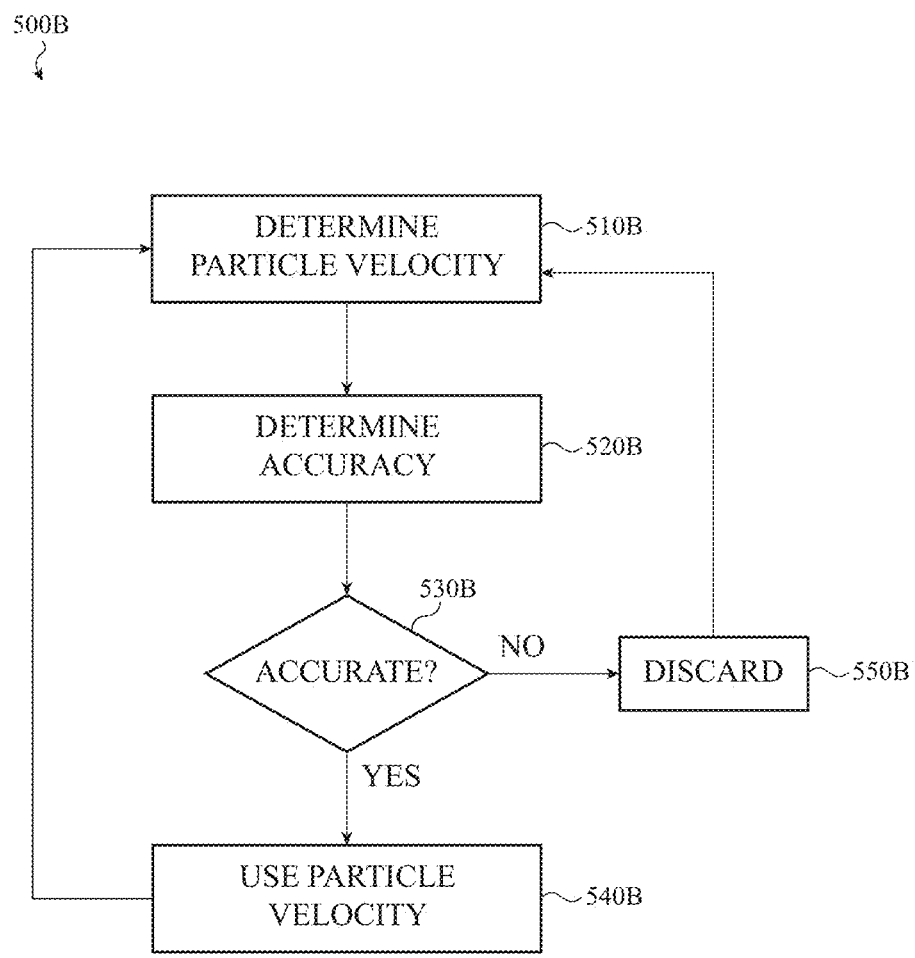
FIG. 5B depicts a flow chart illustrating a second example method for detecting and/or handling one or more obstructions and/or transmission element contamination for one or more self-mixing particulate matter sensors. This example method may be performed by an electronic device, such as the electronic device illustrated in FIGS. 1-3.

FIG. 5B depicts a flow chart illustrating a second example method 500B for detecting and/or handling one or more obstructions and/or transmission element contamination for one or more self-mixing particulate matter sensors. This example method 500B may be performed by an electronic device, such as the electronic device 100 illustrated in FIGS. 1-3.

At 510B, an electronic device may use a self-mixing signal to determine a particle velocity. At 520B, the electronic device may determine an accuracy of the self-mixing signal. The self-mixing signal may be accurate when the self-mixing signal is caused by a particle moving through an associated sensing volume and may be inaccurate when caused by a contamination or obstruction other than a particle moving through the associated sensing volume. For example, the electronic device may determine an accuracy of the self-mixing signal based on a relation between an absolute distance to an object causing reflection or backscatter in a beam of coherent light that is used to generate the self-mixing signal and a sensing volume associated with the beam of coherent light. The flow may then proceed to 530B where the electronic device may determine whether or not the self-mixing signal is accurate. For example, if the absolute distance is within the sensing volume, the electronic device may determine that the self-mixing signal is accurate. If the absolute distance is outside the sensing volume, the electronic device may determine that the self-mixing signal is not accurate.

If the self-mixing signal is accurate, the flow may proceed to 540B where the electronic device may use the particle velocity (such as to determine an air flow and/or a particulate matter concentration) before the flow returns to 510B and the electronic device determines another particle velocity. Otherwise, the flow proceeds to 550B where the electronic device may discard the determined particle velocity before returning to 510B and determining another particle velocity.

Although the example method 500B is illustrated and described as including particular operations performed in a particular order, it is understood that this is an example. In various implementations, various orders of the same, similar, and/or different operations may be performed without departing from the scope of the present disclosure.

For example, the method 500B is illustrated and described as determining particle velocity before determining accuracy of the self-mixing signal. However, in other implementations, the electronic device may determine accuracy of the self-mixing signal before determining particle velocity. Various configurations are possible and contemplated without departing from the scope of the present disclosure.

Figure 5C:
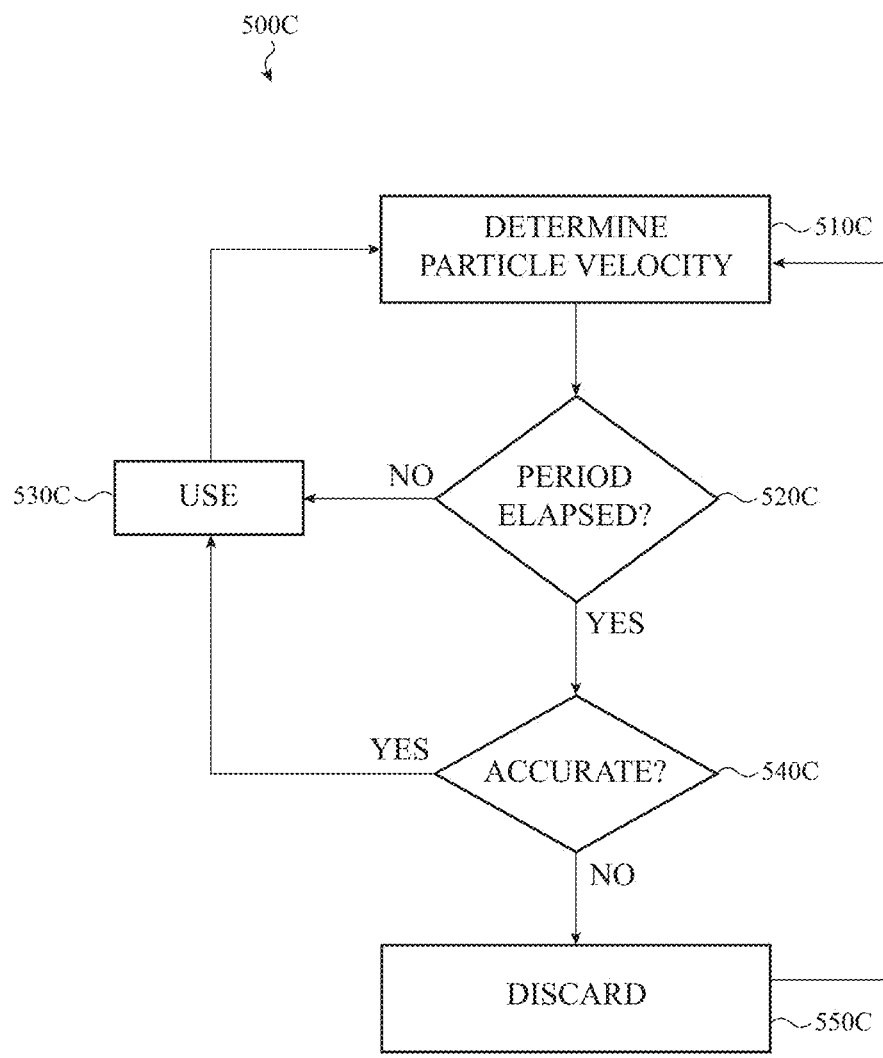
FIG. 5C depicts a flow chart illustrating a third example method for detecting and/or handling one or more obstructions and/or transmission element contamination for one or more self-mixing particulate matter sensors. This example method may be performed by an electronic device, such as the electronic device illustrated in FIGS. 1-3.

FIG. 5C depicts a flow chart illustrating a third example method 500C for detecting and/or handling one or more obstructions and/or transmission element contamination for one or more self-mixing particulate matter sensors. This example method 500C may be performed by an electronic device, such as the electronic device 100 illustrated in FIGS. 1-3.

At 510C, an electronic device may use a self-mixing signal to determine a particle velocity. At 520C, the electronic device may determine whether or not a period has elapsed since the electronic device previously determined accuracy of a self-mixing signal. For example, the electronic device may only determine accuracy once per second, minute, hour, day, and so on. If the period has elapsed, the flow may proceed to 530C where the electronic device may use the particle velocity before the flow returns to 510C and the electronic device determines another particle velocity. Otherwise, the flow may then proceed to 540C where the electronic device may determine whether or not the self-mixing signal is accurate. For example, if the absolute distance of an object causing reflection or backscatter in a beam of coherent light that is used to generate the self-mixing signal is within a particulate sensing volume associated with the beam of coherent light, the electronic device may determine that the self-mixing signal is accurate.

If the self-mixing signal is accurate, the flow may proceed to 530C where the electronic device may use the particle velocity before the flow returns to 510C and the electronic device determines another particle velocity. Otherwise, the flow proceeds to 550C where the electronic device may discard the determined particle velocity before returning to 510C and determining another particle velocity.

Although the example method 500C is illustrated and described as including particular operations performed in a particular order, it is understood that this is an example. In various implementations, various orders of the same, similar, and/or different operations may be performed without departing from the scope of the present disclosure.

For example, the method 500C is illustrated and described as checking accuracy if a period has elapsed. However, in other implementations, such an accuracy may be determined without monitoring of a period, such as continuously, randomly, and so on. Various configurations are possible and contemplated without departing from the scope of the present disclosure.

Figure 5D:
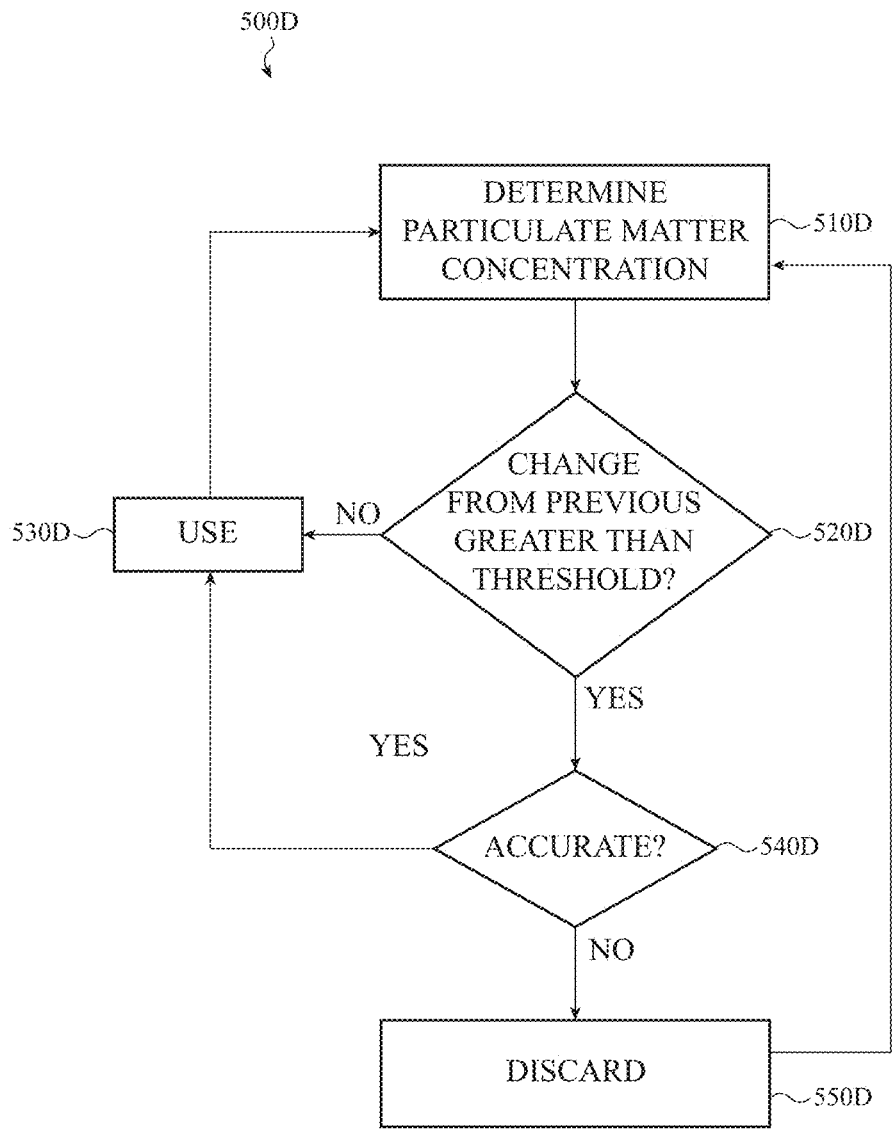
FIG. 5D depicts a flow chart illustrating a fourth example method for detecting and/or handling one or more obstructions and/or transmission element contamination for one or more self-mixing particulate matter sensors. This example method may be performed by an electronic device, such as the electronic device illustrated in FIGS. 1-3.

FIG. 5D depicts a flow chart illustrating a fourth example method 500D for detecting and/or handling one or more obstructions and/or transmission element contamination for one or more self-mixing particulate matter sensors. This example method 500D may be performed by an electronic device, such as the electronic device 100 illustrated in FIGS. 1-3.

At 510D, an electronic device may use a self-mixing signal to determine a particulate matter concentration. At 520D, the electronic device may determine whether or not a change between the particulate matter concentration and a previous particulate matter concentration determination is more than a threshold. For example, the threshold may be a change of more than 0.5 micrograms per cubic meter. If the change is less than or equal to the threshold, the flow may proceed to 530D where the electronic device may use the particle velocity before the flow returns to 510D and the electronic device determines another particle velocity. Otherwise, the flow may then proceed to 540D where the electronic device may determine whether or not the determined particulate matter concentration is accurate. For example, if the absolute distance of an object causing reflection or backscatter in a beam of coherent light that is used to determine the particulate matter concentration is within a particulate sensing volume associated with the beam of coherent light, the electronic device may determine that the particulate matter concentration is accurate.

If the particulate matter concentration is accurate, the flow may proceed to 530D where the electronic device may use the particulate matter concentration before the flow returns to 510D and the electronic device determines another particulate matter concentration. Otherwise, the flow proceeds to 550D where the electronic device may discard the determined particulate matter concentration before returning to 510D and determining another particulate matter concentration.

Although the example method 500D is illustrated and described as including particular operations performed in a particular order, it is understood that this is an example. In various implementations, various orders of the same, similar, and/or different operations may be performed without departing from the scope of the present disclosure.

For example, the method 500D is illustrated and described as determining another particulate matter concentration after discarding a particulate matter concentration determination due to inaccuracy. However, in some implementations, the electronic device may determine that an accurate particulate matter concentration cannot be determined (such as due to a contamination that has not been cleaned and/or an obstruction that has not been removed) and the electronic device may instead provide an indication that an accurate particulate matter concentration cannot be determined. Various configurations are possible and contemplated without departing from the scope of the present disclosure.

Figure 5E:
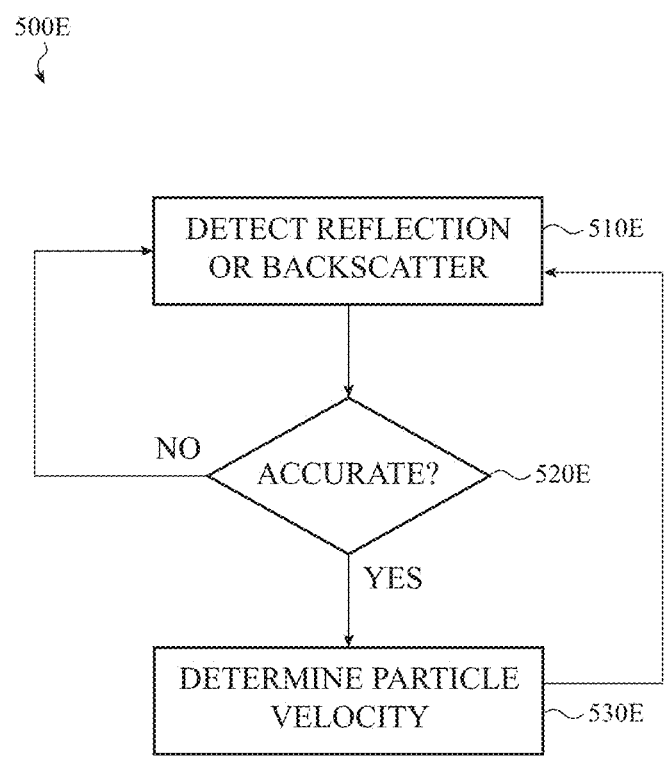
FIG. 5E depicts a flow chart illustrating a fifth example method for detecting and/or handling one or more obstructions and/or transmission element contamination for one or more self-mixing particulate matter sensors. This example method may be performed by an electronic device, such as the electronic device illustrated in FIGS. 1-3.

FIG. 5E depicts a flow chart illustrating a fifth example method 500E for detecting and/or handling one or more obstructions and/or transmission element contamination for one or more self-mixing particulate matter sensors. This example method 500E may be performed by an electronic device, such as the electronic device 100 illustrated in FIGS. 1-3.

At 510E, an electronic device may detect reflection or backscatter from a beam of coherent light resulting from an object (such as a particle) in a path of the beam. The flow may then proceed to 520E where the electronic device may determine whether a self-mixing signal generated from the reflection or backscatter is accurate. The self-mixing signal may be accurate if an absolute distance to the object determined using the self-mixing signal is within a particulate sensing volume associated with the beam. If so, the flow may proceed to 530E where the electronic device determines a particle velocity using the self-mixing signal before the flow returns to 510E and the electronic device may detect additional reflection or backscatter. Otherwise, flow may proceed directly to 510E.

Particles may move very fast. It may not be possible to measure their absolute distance all of the time. Sometimes, a particle may be missed and when attempting to measure absolute distance, detection of an object may not be possible. In such situations, the fact that an absolute distance measurement does not indicate a target outside the sensing volume may be sufficient to flag the measurement as accurate. Various configurations are possible and contemplated without departing from the scope of the present disclosure.

Although the example method 500E is illustrated and described as including particular operations performed in a particular order, it is understood that this is an example. In various implementations, various orders of the same, similar, and/or different operations may be performed without departing from the scope of the present disclosure.

For example, the method 500E is illustrated and described as detecting reflection or backscatter at 510E. However, in some implementations, the electronic device may instead determine whether or not reflection or backscatter is detected. If not, the flow may wait until reflection or backscatter is detected before the flow proceeds to 520E. Various configurations are possible and contemplated without departing from the scope of the present disclosure.

Figure 5F:
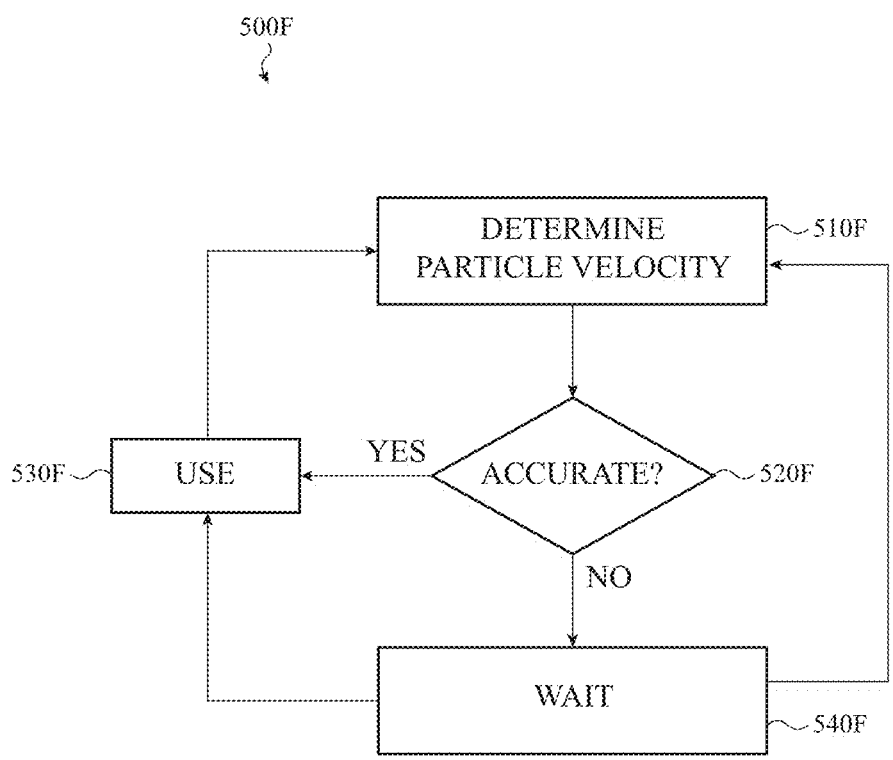
FIG. 5F depicts a flow chart illustrating a sixth example method for detecting and/or handling one or more obstructions and/or transmission element contamination for one or more self-mixing particulate matter sensors. This example method may be performed by an electronic device, such as the electronic device illustrated in FIGS. 1-3.

FIG. 5F depicts a flow chart illustrating a sixth example method 500F for detecting and/or handling one or more obstructions and/or transmission element contamination for one or more self-mixing particulate matter sensors. This example method 500G may be performed by an electronic device, such as the electronic device 100 illustrated in FIGS. 1-3.

At 510F, an electronic device may determine a particle velocity. The electronic device may determine a particle velocity in one or more directions using reflection or backscatter from a beam of coherent light resulting from the particle in a path of the beam. The flow may then proceed to 520F where the electronic device may determine whether the particle velocity is accurate. The particle velocity may be accurate if an absolute distance to the particle determined using the reflection or backscatter is within a particulate sensing volume associated with the beam. If so, the flow may proceed to 530F where the electronic device uses the determined particle velocity before the flow returns to 510F and the electronic device may determine another particle velocity. Otherwise, flow may proceed to 540F where the electronic device may wait (such as for a period of time like 10 milliseconds, 2 seconds, and so on) before returning to 510F and again attempting to determine a particle velocity.

Although the example method 500F is illustrated and described as including particular operations performed in a particular order, it is understood that this is an example. In various implementations, various orders of the same, similar, and/or different operations may be performed without departing from the scope of the present disclosure.

For example, the method 500F is illustrated and described as determining a particle velocity at 510F. However, in some implementations, the electronic device may instead determine whether or not a particle is detected. If not, the flow may wait until a particle is detected and a velocity of that particle in one or more directions is determined before the flow proceeds to 520F. Various configurations are possible and contemplated without departing from the scope of the present disclosure.

Figure 5G:
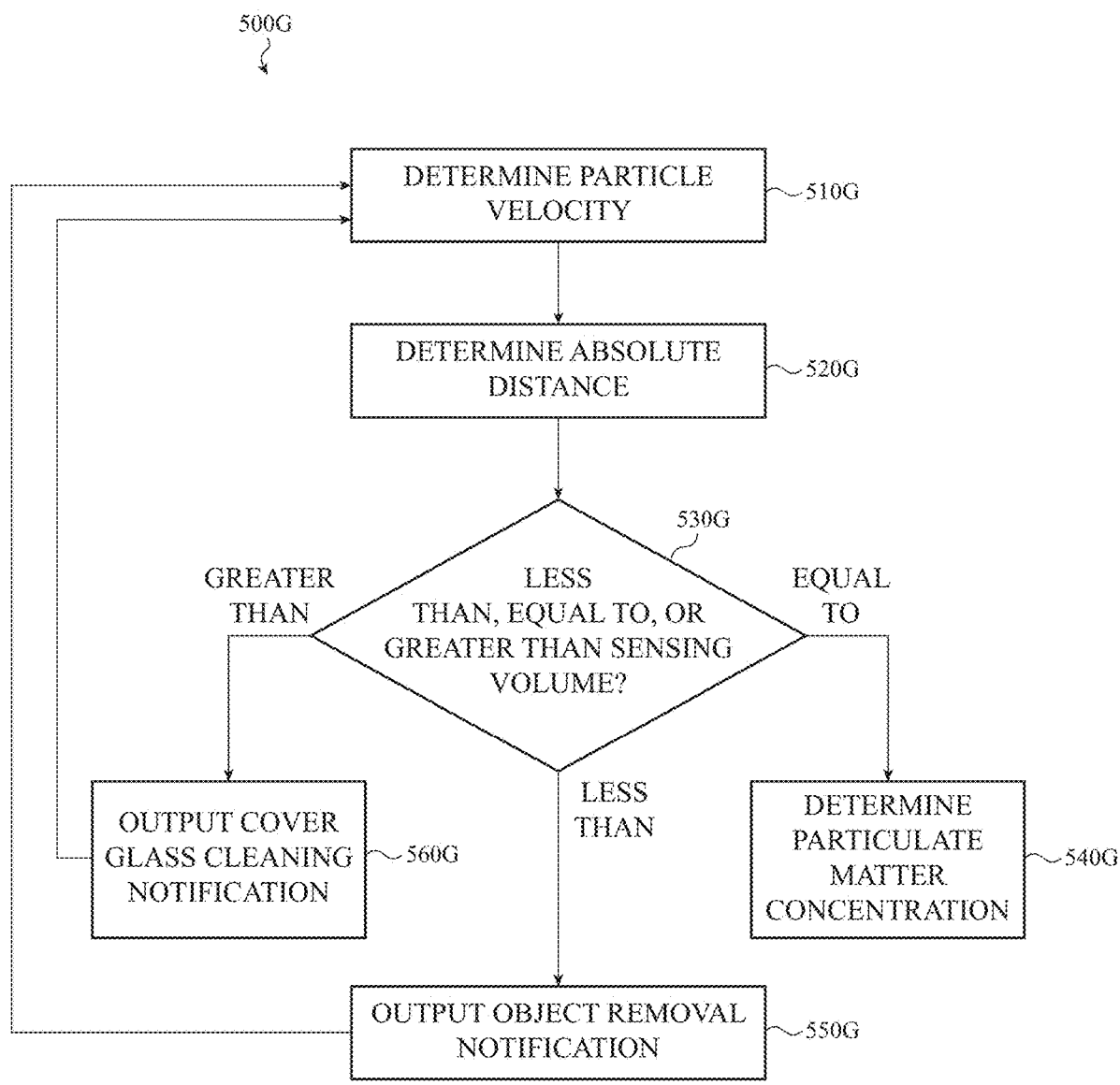
FIG. 5G depicts a flow chart illustrating a seventh example method for detecting and/or handling one or more obstructions and/or transmission element contamination for one or more self-mixing particulate matter sensors. This example method may be performed by an electronic device, such as the electronic device illustrated in FIGS. 1-3.

FIG. 5G depicts a flow chart illustrating a seventh example method 500G for detecting and/or handling one or more obstructions and/or transmission element contamination for one or more self-mixing particulate matter sensors. This example method 500G may be performed by an electronic device, such as the electronic device 100 illustrated in FIGS. 1-3.

At 510G, an electronic device may determine a particle velocity. The electronic device may determine a particle velocity in one or more directions using reflection or backscatter from a beam of coherent light resulting from the particle in a path of the beam. The flow may then proceed to 520G where the electronic device may determine an absolute distance to the particle and/or another object that is causing the reflection or backscatter. The flow may then proceed to 530G where the electronic device may determine whether the absolute distance is less than, equal to, or greater than a sensing volume associated with the beam.

If the absolute distance is less than the sensing volume, the electronic device may determine that an object other than a particle is obstructing the beam and the flow may proceed to 550G where the electronic device may output an object removal notification. The flow may then return to 510G where the electronic device determines another particle velocity.

If the absolute distance is greater than the sensing volume, the electronic device may determine that a contamination is present on a cover glass or other transmission element and the flow may proceed to 560G where the electronic device may output a cover glass cleaning notification. The flow may then return to 510G where the electronic device determines another particle velocity.

If the absolute distance equals the sensing volume, the electronic device may determine that the particle velocity is accurate. The flow may then proceed to 540G where the electronic device may use the particle velocity to determine a particulate matter concentration.

In some situations, the electronic device may not be able to measure any absolute distance. However, the electronic device may determine that determined particle velocities are accurate if the electronic device is unable to measure an absolute distance. Various configurations are possible and contemplated without departing from the scope of the present disclosure.

Although the example method 500G is illustrated and described as including particular operations performed in a particular order, it is understood that this is an example. In various implementations, various orders of the same, similar, and/or different operations may be performed without departing from the scope of the present disclosure.

For example, the method 500G is illustrated and described using the particle velocity at 540G to determine a particulate matter concentration. However, it is understood that this is an example. In some implementations, the electronic device may use the particle velocity to determine an airflow without determining a particulate matter concentration. Various configurations are possible and contemplated without departing from the scope of the present disclosure.

Figure 6A:
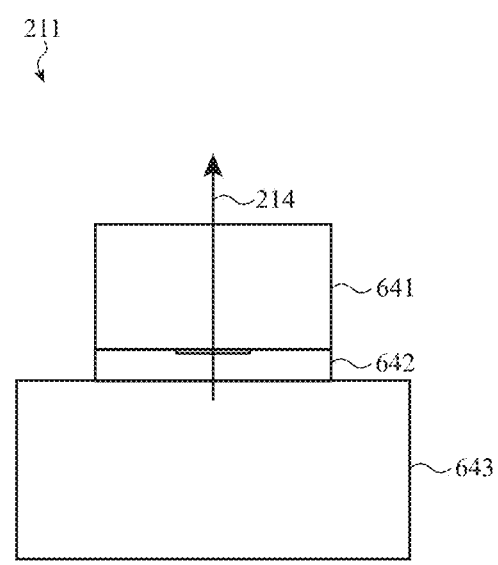
FIG. 6A depicts a vertical-cavity surface-emitting laser that may be used in one or more particulate matter sensors in the electronic device of FIGS. 1-3.

Use of self-mixing signals to determine or estimate particle velocities, airflow, and/or particulate matter concentrations will now be described in more detail. FIG. 6A depicts an example structural diagram of a VCSEL 211 that may be used in one or more particulate matter sensors in the electronic device of FIGS. 1-3. In a typical type of laser, an input energy source causes a gain material within a cavity to emit light. Mirrors on ends of the cavity feed the light back into the gain material to cause amplification of the light and to cause the light to become coherent and (mostly) have a single wavelength. An aperture in one of the mirrors allows transmission of the coherent light.

In the VCSEL 211, there may be two mirrors 643 and 641 on opposite ends of the cavity. The lasing occurs within the cavity 642. In the VCSEL 211, the two mirrors 643 and 641 are shown as distributed Bragg reflectors, which are alternating layers with high and low refractive indices. The cavity 642 contains a gain material, which may include multiple doped layers of III-V semiconductors. In one example, the gain material may be AlGaAs, InGaAs, and/or GaAs. The emitted coherent light 214 can be emitted through the topmost layer or surface of VCSEL 211. In some VCSELs the coherent light is emitted through the bottom layer.

Figure 6B:
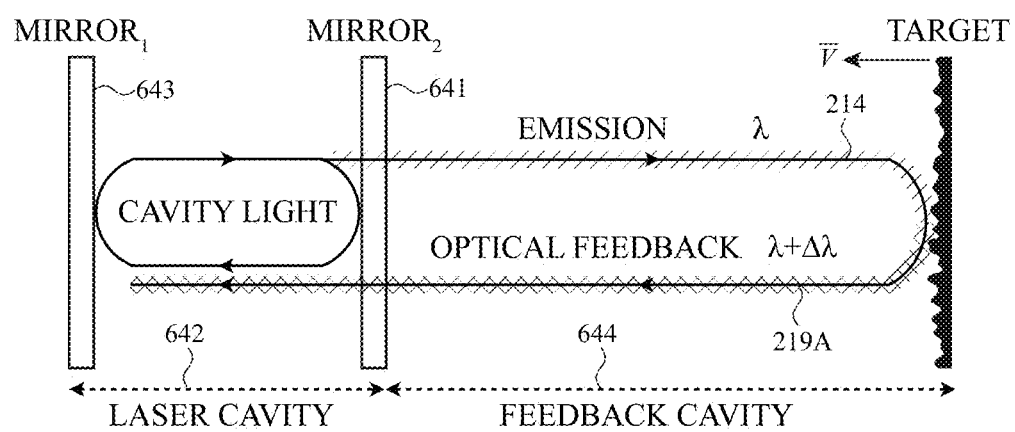
FIG. 6B depicts self-mixing interference in the vertical-cavity surface-emitting laser of FIG. 6A.

FIG. 6B depicts self-mixing interference (or also "optical feedback" or "back-injection") in the VCSEL 211 of FIG. 6A. In FIG. 6B, the cavity 642 has been reoriented so that emitted coherent light 214 is emitted from the cavity 642 to the right. The cavity 642 has a fixed length established at manufacture. The emitted coherent light 214 travels away from the cavity 642 until it intersects or impinges on a target (such as a particle or other object). The gap of distance from the emission point through the mirror 641 of the emitted coherent light 214 to the target is termed the feedback cavity 644. The length of the feedback cavity 644 (from the mirror 641 to the target) may be variable as the target can move with respect to the VCSEL 211.

The emitted coherent light 214 is reflected or backscattered back into the cavity 642 by the target. The reflected or backscattered light 219A enters the cavity 642 to interact with the original emitted coherent light 214. This results in a combined emitted coherent light. The combined emitted coherent light may have characteristics (e.g., a wavelength or power) that differ from what the emitted coherent light 214 would have in the absence of reflection and self-mixing interference.

Figure 7A:
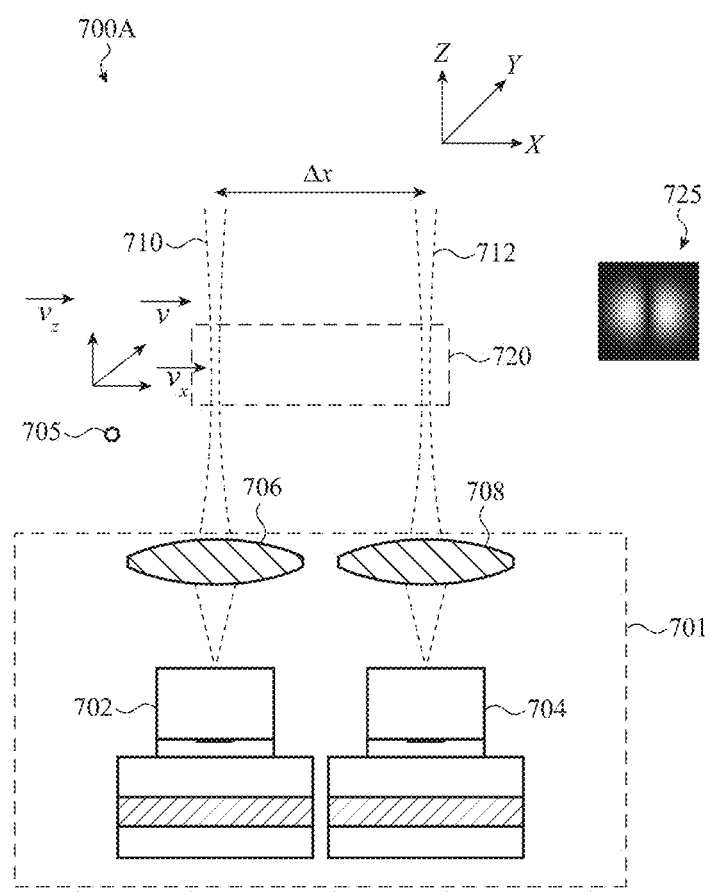
FIG. 7A depicts a parallel self-mixing sensing system for measuring particulate matter concentration and/or particle velocities of particulate matter.
Figure 7B:
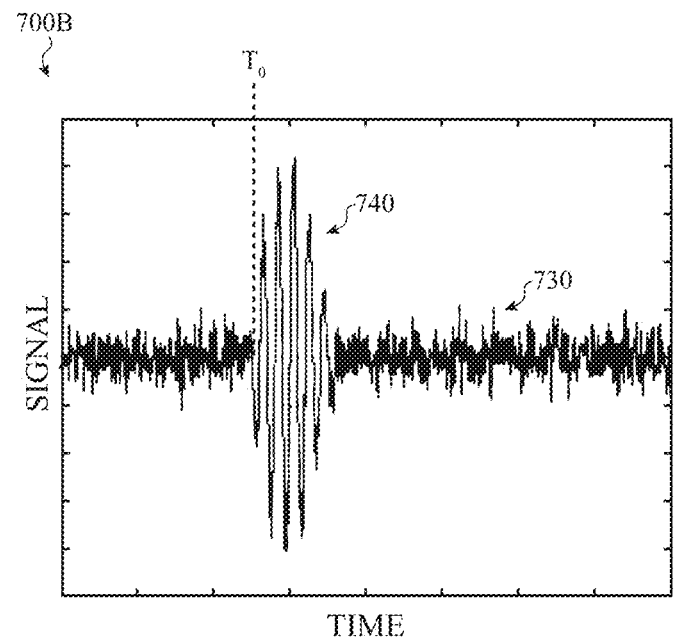
FIG. 7B depicts a first self-mixing signal that may be measured by the parallel self-mixing sensing system of FIG. 7A.
Figure 7C:
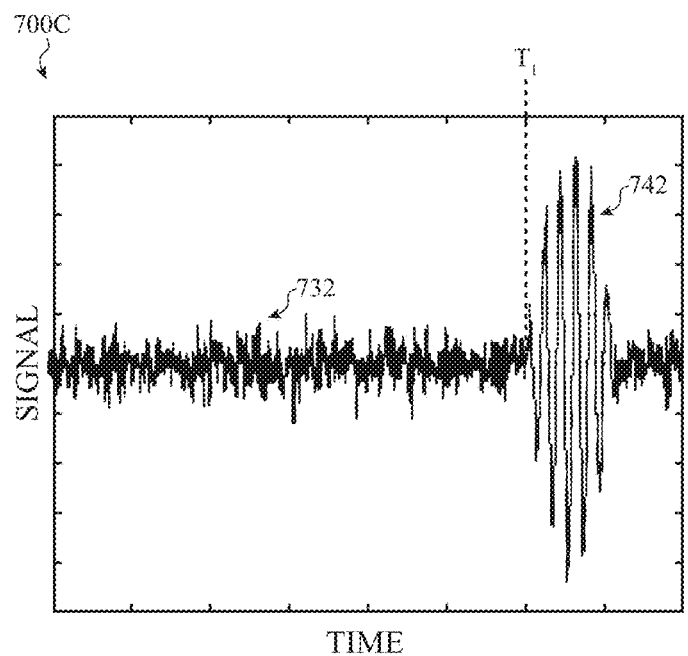
FIG. 7C depicts a second self-mixing signal that may be measured by the parallel self-mixing sensing system of FIG. 7A.

FIGS. 7A through 7C are diagrams illustrating a parallel self-mixing sensing system 700A for measuring particle velocity components and corresponding self-mixing signals. The parallel self-mixing sensing system 700A includes a self-mixing module 701. The self-mixing module 701 includes a first light source and detector unit 702, a first optical element (e.g., lens) 706, a second light source and detector unit 704 and a second optical element (e.g., lens) 708. The first light source and detector unit 702 can be a monolithically integrated unit including a first light source and a first photodetector. In some implementations, the first light source is a laser source such as a first VCSEL, and the first photodetector is an intra- or extra-cavity photodiode monolithically integrated with the first VCSEL. Similarly, the second light source and detector unit 704 can be a monolithically integrated unit including a second light source such as a second VCSEL and a second photodetector (e.g., a photodiode) integrated similarly with the second VCSEL.

The first VCSEL generates the first light beam 710, and the second VCSEL generates a second light beam 712. A center-point, defined as the point with highest irradiance on the transverse plane where the laser beam has the smallest footprint, i.e., the focal point, of the first light beam 710 is at a distance Delta_x from a center-point of the second light beam 712. The value of the distance Delta_x may be within a range of about 15 µm to 100 µm when two VCSELs are used. However, in the Laguerre-Gaussian beam implementation using a single VCSEL, Delta_x may be within a range of about 0.25 µm to 2.5 µm. A focal region 720 includes focal points of the first light beam 710 and the second light beam 712. A particle 705 moving in the focal region 720 can be characterized by the parallel self-mixing sensing system 700A. For example, when the particle 705 passes through one of the first light beam 710 or the second light beam 712, an absolute value of the respective velocity in the Z direction (|Vz|) can be measured from the Doppler shift using the self-mixing interferometry technique. For example, when the particle 705 is passing near the focal point of the first light beam 710, it may scatter part of the first light beam 710, a portion of which can reach and recouple with the resonant cavity of the first VCSEL. Upon this coherent interaction, the first photodetector may detect a first self-mixing signal and measure a first timing associated with the first signal.

As the particle 705 moves in the focal region 720, it may pass near a focal point of the second light beam 712, and may scatter part of the second light beam 712, a portion of which may reach and recouple with the resonant cavity of the second VCSEL. Upon this coherent interaction, the second photodetector may detect a second self-mixing signal and measure a second timing associated with the second signal. The time difference Delta_t between the first timing (T0) and the second timing (T1) may be used (e.g., by a processor) to determine a horizontal velocity component (Vx) of the particle 705 by simply dividing the distance traveled (Delta_x) by the particle 705 in X direction to the time difference Delta_t (Vx=Delta_x/Delta_t). The processor can be, for example, a processor of a host device such as a smart phone or a smart watch.

In one or more implementations, the first and second photodetectors may be separate from the first and second VCSELs and be positioned by the side of the VCSELs, for example, be implemented as side photodetectors on the chip. In these implementations, a cover glass on a separate beam-splitting element with a beam splitting ratio can be used to reflect the first and second light beams 710 and 712 to the side photodetectors, whose main purpose is to monitor optical power levels of the reflected lights. The power levels of the light reflected from the cover glass and/or the separate beam splitting element is a measure of the optical output power levels of the first and second VCSELs. Self-mixing interference induced by the particle 705 perturbs the output power of the VCSELs and, therefore, results in a measurable signal on the corresponding photodetectors.

In some implementations, the first and the second light beams may be realized based on a single laser source (e.g., first VCSEL). In some such implementations, the single beam of the single laser source can be converted into a higher order Laguerre-Gaussian beam having two separate lobes 725. Each lobe of the lobes 725 may function as one of the first and the second light beams 710 and 712 and can be used similarly to characterize the particle 705, as described above. In this implementation, the self-mixing signal may be read from a single photodetector.

In one or more implementations, the light source and detector unit 702 and/or 704 may be a monolithic VCSEL-photodetector unit and include a top distributed Bragg reflector, a multi-quantum well active region, and a bottom distributed Bragg reflector. The bottom distributed Bragg reflector may include an intra-cavity photodetector layer.

The chart 700B, shown in FIG. 7B, represents a first example signal registered by the first photodetector of the first light source and detector unit 702. The registered first example signal includes a background (e.g., noise) 730 and a first self-mixing signal 740. The first timing T0 is a starting time of the first self-mixing signal 740. Alternatively, T0 may be defined as the peak point of the envelope of the first self-mixing signal 740.

The chart 700C, shown in FIG. 7C, represents a second example signal registered by the second photodetector of the second light source and detector unit 704. The registered second example signal in this case includes a background (e.g., noise) 732 and a second self-mixing signal 742. The second timing T1 is a starting time of the second self-mixing signal 742. Alternatively, T1 may be defined as the peak point of the envelope of the self-mixing signal 742. As described above, the time difference Delta_t=T1−T0 may be used to fully determine a value of a velocity Vx of the particle 705 along the X axis. In addition, the direction of the particle 705 motion along the X axis can be determined by comparing T0 to T1.

Although FIGS. 7A-7C illustrate use of the first and second light source and detector units 702, 704 to detect velocity in the X plane, it is understood that this is an example. In various implementations, one or more additional pairs of light source and detector units (and/or a single light source and detector using split and/or other multiple beams) may be positioned perpendicular to the first and second light source and detector units 702, 704 in the Y and/or Z planes to detect velocity in the Y and/or Z planes, respectively. Various configurations for measuring and determining and/or estimating particle velocity are possible and contemplated without departing from the scope of the present disclosure.

Use of self-mixing signals to determine or estimate absolute distances will now be described in more detail. As previously discussed, FIG. 6B shows a diagram of components of a laser capable of self-mixing interference that can produce changes in interferometric parameters. As previously discussed, there may be two mirrors 643 and 641 enclosing the lasing material within the cavity 642. In VCSELs, the mirrors may be implemented as distributed Bragg reflectors. In the absence of a target to produce reflection, the emitted coherent light 214 would have a wavelength λ.

In the example shown, there is a target moving with respect to the laser with a speed (magnitude) $\bar{v}$. The velocity of the movement may be either toward or away from the laser. The target produces a reflected or backscattered light 219A that, due to Doppler effect created by the movement, has an altered wavelength λ+Delta_λ. The Doppler induced change in wavelength is given by Delta_λ=$\bar{v}$×(2λ/c). The reflected or backscattered light 219A induces self-mixing interference in the laser, which can produce changes in interferometric parameters associated with the coherent light. These changed interferometric parameters can include changes in junction voltage or current, a laser bias current, or supply power, or other interferometric parameters.

Using the particular example of power, and recalling from above that in the absence of a strong back reflection (e.g., no specular reflector), the change in power is related to the length of the optical feedback cavity 644 by Delta_P∝cos (4πL/λ), one sees that movement of the target causes the length of the optical feedback cavity 644 to change through multiple wavelengths of the emitted coherent light 214. The sinusoidal movement of the target is shown in the plot 822 in the top of correlated graphs 820 of FIG. 8A. The movement causes the change in power to have the primarily sinusoidal plots 824a-c shown in the lower of the correlated graphs 820. The motion of the target reverses direction at times 826a and 826b. In the case of strong back reflection, the functional form for the change in power has further harmonics and has a distorted cosine shape that is indicative of the direction of target motion. The sinusoidal plots 824a-c would then be altered accordingly.

Figure 8A:
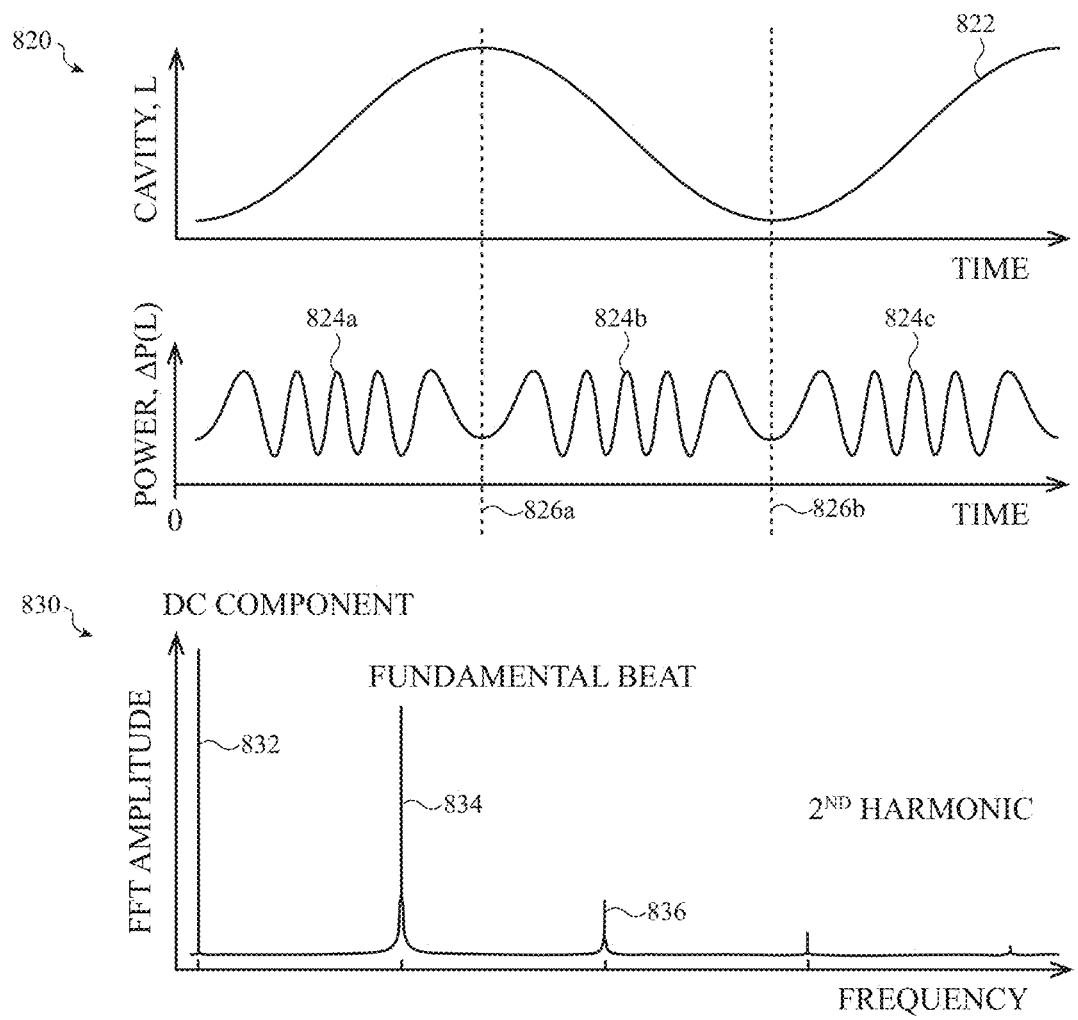
FIG. 8A depicts self-mixing or coherent optical feedback in a vertical-cavity surface-emitting laser that emits coherent light toward, and receives reflected or backscattered light from, a moving object.

Because the movement of the target causes the optical feedback cavity length to change through multiple wavelengths of the emitted coherent light, the sinusoidal power signal (or an equivalent sinusoidal signal of another interferometric parameter) is amenable for spectrum analysis, such as with a Fast Fourier Transform (FFT). The bottom graph 830 of FIG. 8A shows an amplitude (or "magnitude") plot from such a spectrum analysis. The spectrum may have been calculated from samples taken within a sampling time interval contained between time 0 and time 826a, during which the target is moving in a single direction with respect to the laser.

In some embodiments, the spectrum analysis may use a sample size of 128 or 256 samples. The spectrum analysis may also apply a filter (such as a triangle filter, a raised cosine filter, or the like) to the samples of the signal of the interferometric parameter being measured (such as the supply power or change therein, or the junction voltage or current, or the laser bias current, among others).

FIG. 8A shows a graph 830 of the magnitude or amplitude spectrum in which there are three pronounced components. There is a DC component 832, which reflects the fact that the signal of the interferometric parameter often has a steady state value around which the signal oscillates sinusoidally. There is then a first harmonic frequency, or fundamental beat 834, that is associated with the major or predominant frequency $f_B$ of the sinusoidal signal of the interferometric parameter. It can be shown that in some configurations $f_B$=c×(Delta_λ/λ$^2$), where Delta_λ is the Doppler shift in the wavelength due target motion, and is given by Delta_λ= $\bar{v}$×(2λ/c). In the case of sufficient back reflection into the cavity, the signal is rarely a pure sinusoid, so the magnitude spectrum may also show a second harmonic frequency component at frequency 2×$f_B$, and a third harmonic frequency component at frequency 3×$f_B$. Higher harmonic frequency components may exist but are typically reduced. The measured fundamental beat frequency $f_B$ can be used to calculate Delta_λ, from which $\bar{v}$ can be calculated. Examples of vales relating to the speed of the target to Delta_λ and $f_B$ are given in Table 1, for a laser having unmixed emitted light with a wavelength of 940 nm in the absence of optical feedback, under a specific environment, refractive index and beam angle:

TABLE 1

| Speed $\bar{v}$ | Delta_λ | $f_B$ |
| --- | --- | --- |
| 1 mm/s | 6.3 × 10$^{-9}$ nm | 2.13 kHz |
| 10 mm/s | 6.3 × 10$^{-8}$ nm | 21.3 kHz |
| 100 mm/s | 6.3 × 10$^{-7}$ nm | 213 kHz |

Figure 8B:
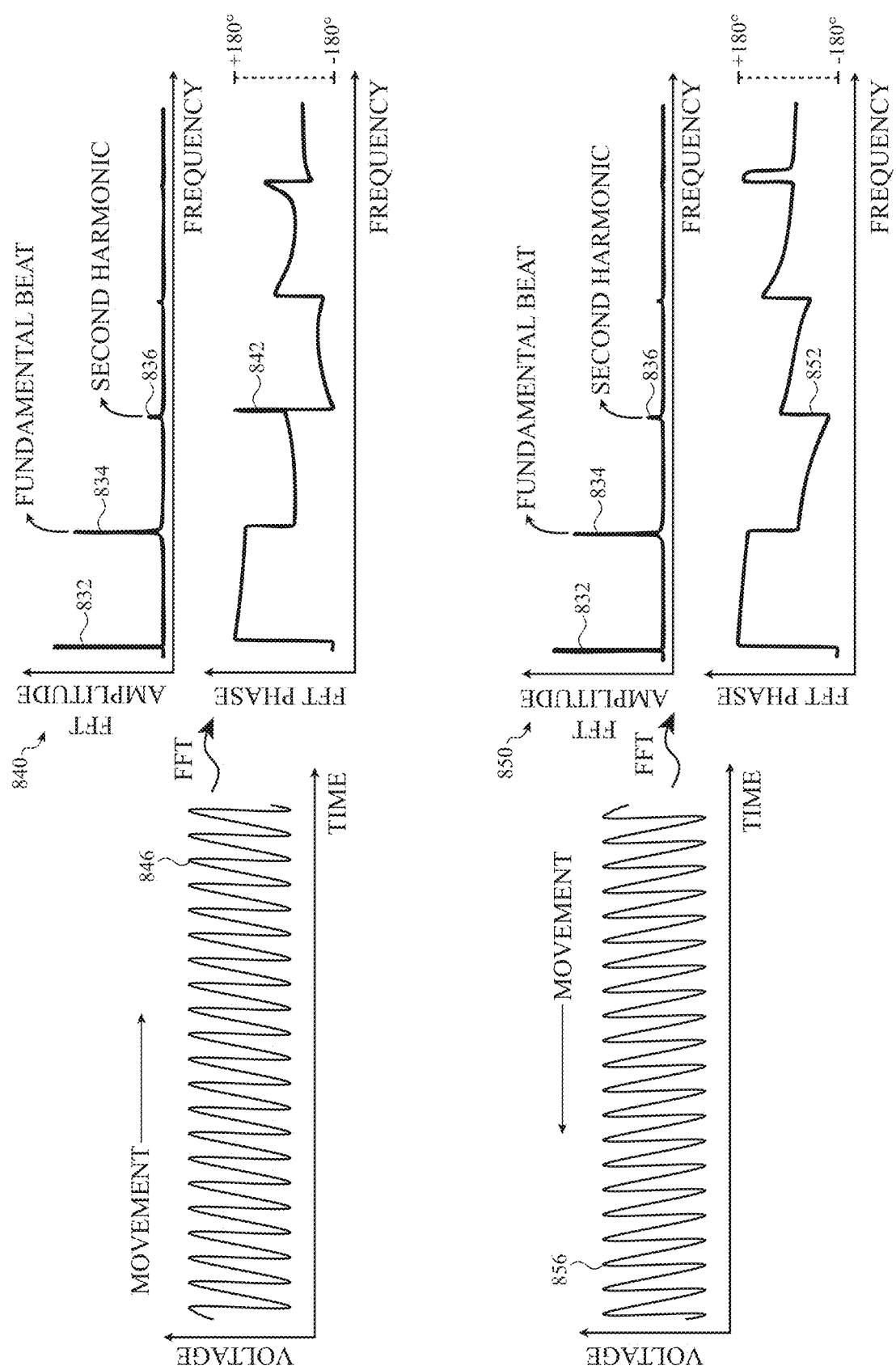
FIG. 8B depicts graphs from spectrum analyses of interferometric parameters of a vertical-cavity surface-emitting laser that are measured for moving objects.

FIG. 8B shows a first combined magnitude and phase graph 840 obtained from, in one embodiment, a spectrum analysis of a junction voltage signal. The top of the combined magnitude and phase graph 840 shows the magnitude of the FFT, while the bottom of graph 840 shows the phase.

In the graph 840, the target is moving in a first direction with respect to the laser. The movement of the target produces a predominantly but non-ideal sinusoidal form, so that there is more than one harmonic present, as shown in the amplitude plot in the top of the combined magnitude and phase graph 840. FIG. 8B also shows a second combined magnitude and phase graph 850 obtained under the same conditions except that the target is moving in the opposite direction (at the same speed).

A phase shift at the second harmonic frequency may be used to determine a direction of the motion. The specific example shown in the phase plot of graph 840 is from a spectrum analysis performed on a voltage signal induced by the target moving in a first direction with respect to the laser. The direction is obtained by calculating:

$$2\times\text{phase}\{\text{Fundamental Harmonic}\}-\text{phase}\{\text{Second Harmonic}\}.$$

When this value is greater than zero, the target is moving toward the laser, whereas when the value is less than zero, the target is moving away from the laser. Next, the specific example shown in the phase plot of graph 850 is from an example spectrum analysis performed on a voltage signal induced by the target moving in the opposite of the first direction with respect to the laser. The calculation of the above quantity in this case will be less than zero.

Figure 8C:
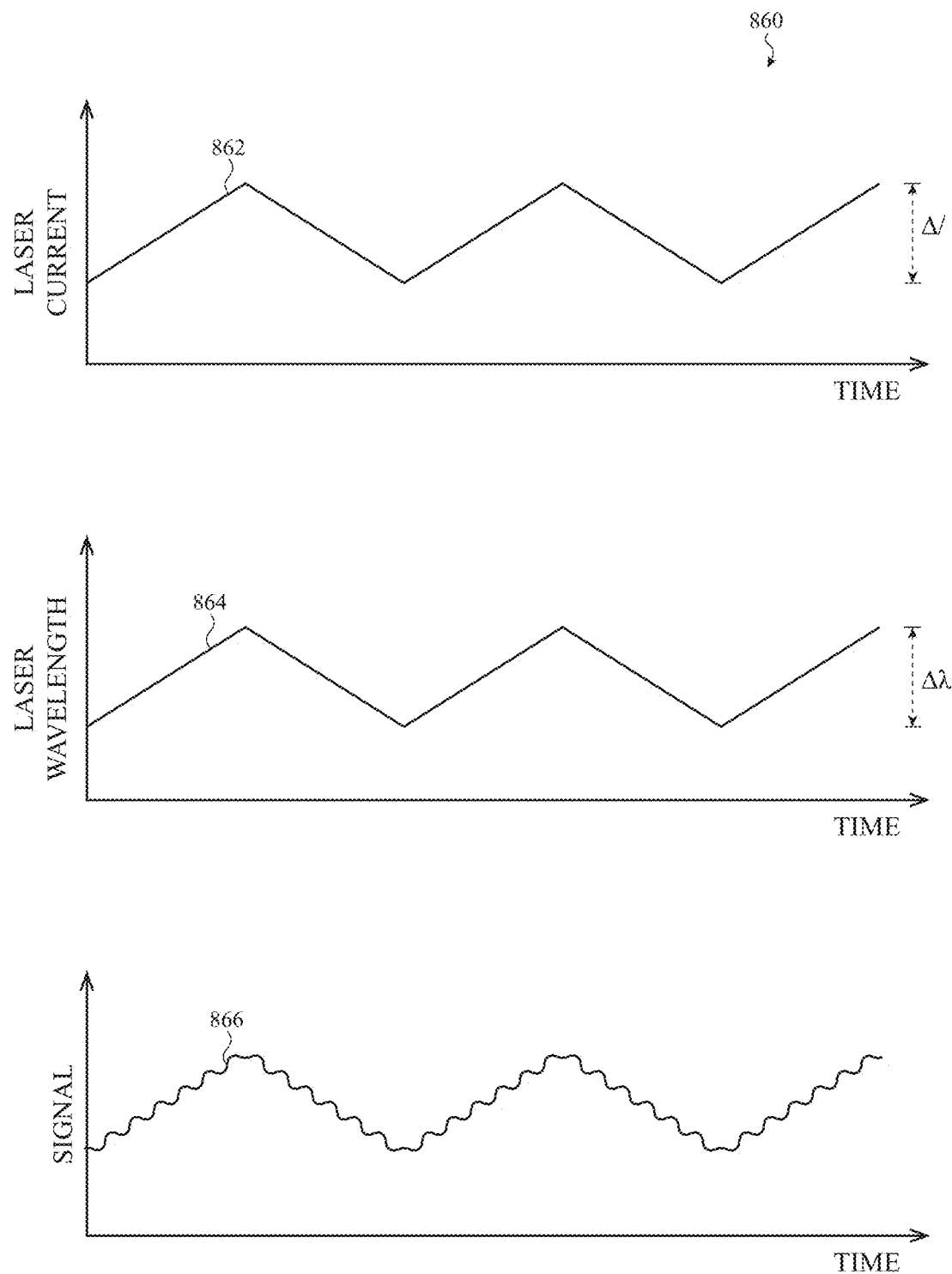
FIG. 8C depicts time correlated graphs of a laser current, laser wavelength, and a signal of an interferometric parameter that may be used as part of a spectrum analysis.

FIG. 8C shows time correlated graphs 860 relating to a laser current 862 (also called a modulation current) with the resulting laser wavelength 864 and the resulting signal 866 of the measured interferometric property. By driving a laser with a modulation current, such as the laser current 862, the produced coherent light has a laser wavelength 864 that similarly varies according to a triangle wave. The self-mixing interference causes the signal 866 of the interferometric parameter to have the form of a sinusoid (or distorted sinusoid) imposed on a triangle wave. One use of applying the laser current 862 with a triangle wave is to allow for separate spectrum analyses (e.g., FFTs, as explained with respect to FIG. 8D) of samples taken during the time intervals of the ascending segment and of the descending segment of the triangle wave. While the graphs 860 are shown for a triangle waveform for laser current 862, some embodiments may use other alternatingly ascending and descending modulation currents for the laser. Also, while the laser current 862 is shown with equal ascending and descending time intervals, in some embodiments these time intervals may have different durations.

Figure 8D:
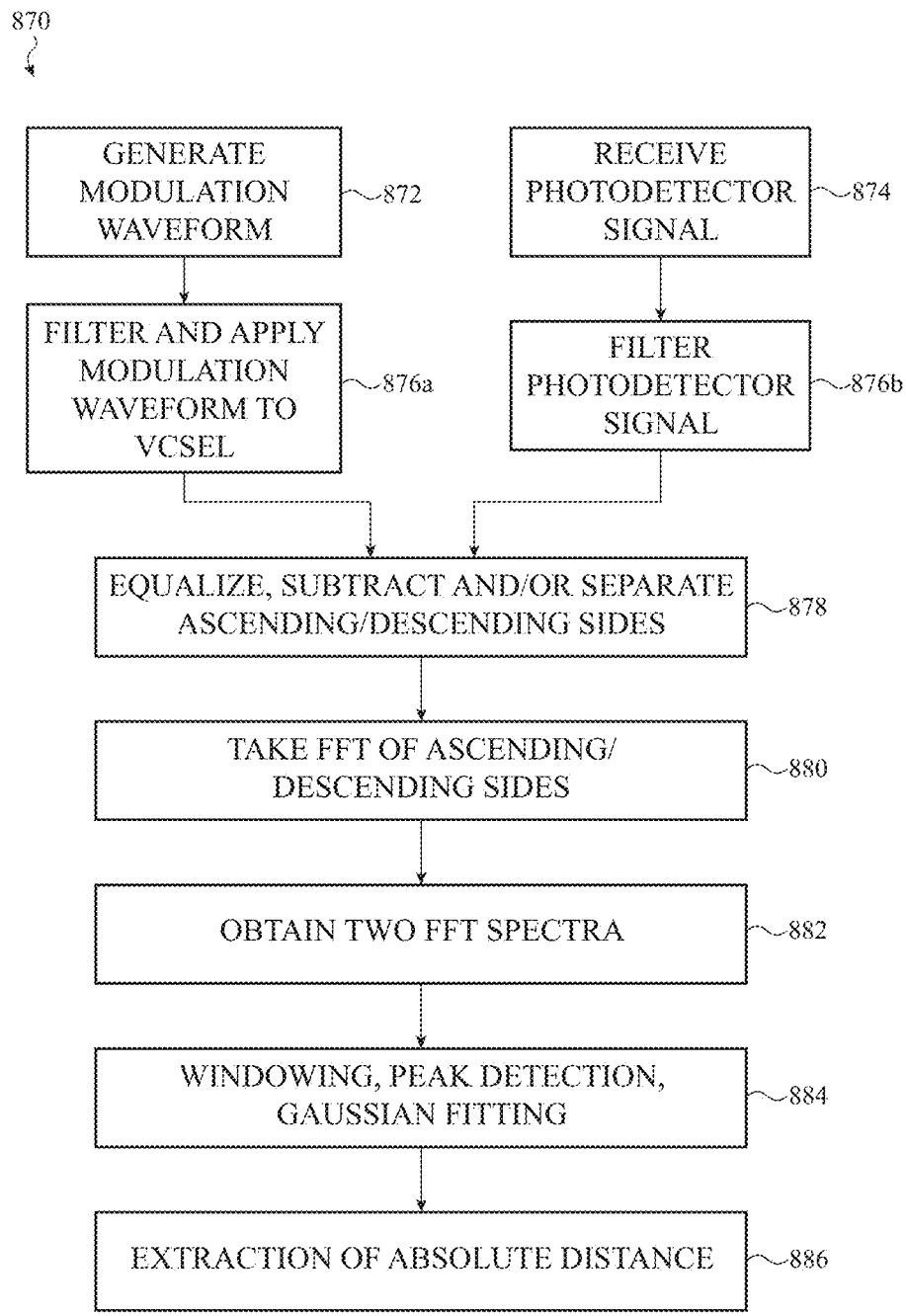
FIG. 8D depicts a flow chart illustrating a spectrum analysis method for determining absolute distance.
Figure 8E:
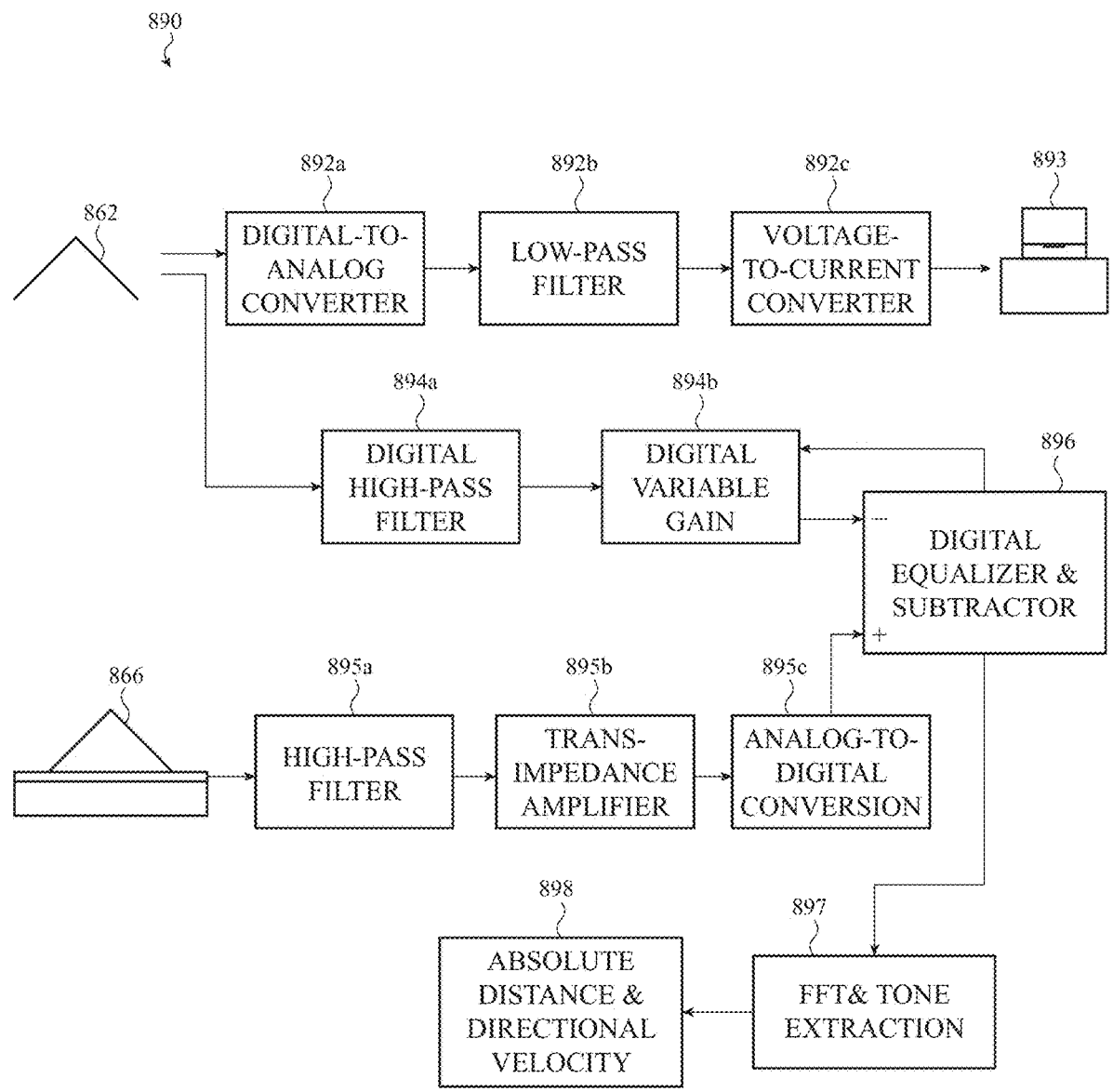
FIG. 8E depicts a block diagram of a system that implements a spectrum analysis method for determining absolute distance.

FIGS. 8D and 8E respectively show a flow chart of a method 870 and a block diagram of a system 890 to implement a spectrum analysis procedure that can be used as part of determining and/or estimating an absolute distance. The method 870 and the system 890 may drive or modulate a laser, such as one or more VCSELs, with a modulation current 862. The method 870 and the system 890 may also analyze a signal 866 related to an interferometric parameter. For purposes of explanation, in the embodiments of FIGS. 8D and 8E it will be assumed that the modulation current 862 has a triangle waveform. One of skill in the art will recognize how the method 870 and the system 890 can be implemented using alternative modulation current waveforms. The spectrum analysis method 870 concurrently analyzes the modulation current 862 and the signal 866 of the interferometric parameter. The modulation current 862 and the signal 866 of the interferometric parameter are received at respective receiving circuits. Such receiving circuits may be one or more of the blocks of the system shown in FIG. 8E and described below, or may be one or more dedicated processing units such as a graphics processing unit, an ASIC, or an FPGA, or may be a programmed microcomputer, microcontroller, or microprocessor. Various stages of the method may be performed by separate such processing units, or all stages by one (set of) processing units.

At the initial stage 872 of the method 870, an initial signal is generated, such as by a digital or an analog signal generator. At stage 876a the generated initial signal is processed as needed to produce the triangle waveform modulation current 862 that is applied to the VCSEL. Stage 876a can be, as needed, operations of digital-to-analog conversion (DAC) (such as when the initial signal is an output of a digital step generator), low-pass filtering (such as to remove quantization noise from the DAC), and voltage-to-current conversion.

The application of the modulation current 862 to the VCSEL induces a signal 866 in the interferometric property. It will be assumed for simplicity of discussion that the signal 866 of the interferometric property is from a photodetector, but in other embodiments it may be another signal of an interferometric property from another component. At initial stage 874 of the method 870, the signal 866 is received. At stage 876b, initial processing of the signal 866 is performed as needed. Stage 876b may be high-pass filtering or a digital subtraction.

At stage 878 the processing unit may equalize the received signals in order to match their peak-to-peak values, mean values, root-mean-square values, or any other characteristic values, if necessary. For example the signal 866 may be a predominant triangle waveform component being matched to the modulation current 862, with a smaller and higher frequency component due to changes in the interferometric property. High-pass filtering may be applied to the signal 866 to obtain the component signal related to the interferometric property. Also this stage may involve separating and/or subtracting the parts of the signal 866 and the modulation current 862 corresponding to the ascending and to the descending time intervals of the modulation current 862. This stage may include sampling the separated information.

At stages 880 and 882, a separate FFT is first performed on the parts of the processed signal 866 corresponding to the ascending and to the descending time intervals. Then the two FFT spectra are analyzed.

At stage 884, further processing of the FFT spectra can be applied, such as to remove artifacts and reduce noise. Such further processing can include windowing, peak detection, and Gaussian fitting around the detected peak for increased frequency precision. From the processed FFT spectra data, information regarding the absolute distance can be obtained at stage 886.

FIG. 8E shows a block diagram of a system 890 that may implement the spectrum analysis just described in the method 870. In the exemplary system 890 shown, the system 890 includes generating an initial digital signal and processing it as needed to produce a modulation current 862 as an input to the VCSEL 893. In an illustrative example, an initial step signal may be produced by a digital generator to approximate a triangle function. The digital output values of the digital generator are used in the digital-to-analog (DAC) converter 892a. The resulting voltage signal may then be filtered by the low-pass filter 892b to remove quantization noise. Alternatively, an analog signal generator based on an integrator can be used to generate an equivalent voltage signal directly. The filtered voltage signal then is an input to a voltage-to-current converter 892c to produce the desired modulation current 862 in a form for input to the VCSEL 893.

As described above, movement of a target can cause changes in an interferometric parameter, such as a parameter of the VCSEL 893 or of a photodetector operating in the system. The changes can be measured to produce a signal 866. In the embodiment shown it will be assumed the signal 866 is measured by a photodetector. For the modulation current 862 having the triangle waveform, the signal 866 may be a triangle wave of a similar period combined with a smaller and higher frequency signal related to the interferometric property.

The signal 866 is first passed into the high-pass filter 895a, which can effectively convert the major ascending and descending ramp components of the signal 866 to DC offsets. As the signal 866 from a photodetector (or a VCSEL in other embodiments) may typically be a current signal, the transimpedance amplifier 895b can produce a corresponding voltage output (with or without amplification) for further processing.

The voltage output can then be sampled and quantized by the analog-to-digital conversion (ADC) block 895c. Before immediately applying a digital FFT to the output of the ADC block 895c, it can be helpful to apply equalization. The initial digital signal values from the digital generator used to produce the modulation current 862 are used as input to the digital high pass filter 894a to produce a digital signal to correlate with the output of the ADC block 895c. An adjustable gain can be applied by the digital variable gain block 894b to the output of the digital high pass filter 894a.

The output of the digital variable gain block 894b is used as one input to the digital equalizer and subtractor block 896. The other input to the digital equalizer and subtractor block 896 is the output of the ADC block 895c. The two signals are differenced, and used as part of a feedback to adjust the gain provided by the digital variable gain block 894b.

Equalization and subtraction may be used to clean up any remaining artifacts from the triangle that may be present in the signal 866. For example, if there is a slope error or nonlinearity in the signal 866, the digital high pass filter 894a may not fully eliminate the triangle and artifacts may remain. In such a situation, these artifacts may show up as low frequency components after the FFT and make the peak detection difficult. Applying equalization and subtraction may fully remove these artifacts.

Once an optimal correlation is obtained by the feedback, an FFT, indicated by block 897, can then be applied to the components of the output of the ADC block 895c corresponding to the rising and descending side of the triangle wave. From the FFT spectra obtained, absolute distance and/or directional velocity may be inferred using the detected peak frequencies on the rising and descending sides, as discussed above and indicated by block 898.

The method 870 just described, and its variations, involve applying a spectrum analysis to the sinusoid (or distorted sinusoid) of a signal of an interferometric parameter. However, it is understood that this is an example. In other implementations, alternate methods for determining absolute distances may be obtained directly from the time domain signal of an interferometric parameter, without applying a spectrum analysis. Various configurations are possible and contemplated without departing from the scope of the present disclosure.

In various implementations, a portable electronic device that senses particulate matter may include at least one optically transparent material; at least one optical element; a self-mixing interferometry sensor configured to emit a beam of coherent light from an optical resonant cavity through the at least one optically transparent material via the at least one optical element to illuminate an object, receive a reflection or backscatter of the beam into the optical resonant cavity, and produce a self-mixing signal resulting from self-mixing of the coherent light within the optical resonant cavity; and a processor. The processor may be configured to determine a particle velocity using the self-mixing signal, determine a particulate matter concentration using the particle velocity and a particle count, determine an absolute distance to the object using the self-mixing signal, and determine whether the particulate matter concentration is accurate by determining if the absolute distance corresponds to an inside or an outside of a particulate sensing volume associated with the beam of coherent light.

In some examples, the processor may determine the particle velocity using a first self-mixing signal measured from a first beam of coherent light and a second self-mixing signal measured from a second beam of coherent light. In various such examples, the processor may determine the particle velocity using a known angle between the first beam of coherent light and the second beam of coherent light. In a number of such examples, the self-mixing interferometry sensor may include a first vertical-cavity surface-emitting laser and a second vertical-cavity surface-emitting laser, the first vertical-cavity surface-emitting laser may emit the first beam of coherent light, and the second vertical-cavity surface-emitting laser may emit the second beam of coherent light. In some such examples, the self-mixing interferometry sensor may be a single vertical-cavity surface-emitting laser and the at least one optical element may split the beam of coherent light into the first beam of coherent light and the second beam of coherent light.

In various examples, the at least one optical element may focus a beam of coherent light at a location corresponding to the sensing volume. In a number of examples, the processor may discard the particulate matter concentration upon determining the particulate matter concentration is inaccurate.

In some implementations, a portable electronic device that senses particulate matter may include a self-mixing interferometry sensor configured to emit a beam of coherent light from an optical resonant cavity, receive a reflection or backscatter of the beam into the optical resonant cavity, and produce a self-mixing signal resulting from self-mixing of the coherent light within the optical resonant cavity; and a processor. The processor may be configured to determine, using the self-mixing signal, an absolute distance to an object causing the reflection or the backscatter of the beam of coherent light and when the absolute distance is within a predetermined sensing volume, determine a particle velocity using the self-mixing signal.

In various examples, the processor may wait a period of time before determining the particle velocity when the absolute distance is outside the predetermined sensing volume. In a number of examples, the processor may determine that the particle velocity cannot be determined when the absolute distance is outside the predetermined sensing volume. In some examples, the processor may make a series of absolute distance determinations when the absolute distance is outside the predetermined sensing volume and wait until one of the series of absolute distance determinations is within the predetermined sensing volume or cannot be determined before determining the particle velocity. In various examples, the processor may determine the absolute distance based on a modulation of the beam of coherent light. In some examples, when the absolute distance is outside the predetermined sensing volume, the processor may determine a particle velocity using the self-mixing signal and signal an inaccuracy in the particle velocity. In various examples, the self-mixing interferometry sensor may be at least one vertical-cavity surface-emitting laser optically coupled with a photodetector.

In a number of implementations, a portable electronic device that senses particulate matter may include a self-mixing interferometry sensor configured to emit a beam of coherent light from an optical resonant cavity, receive a reflection or backscatter of the beam into the optical resonant cavity, and produce a self-mixing signal resulting from self-mixing of the coherent light within the optical resonant cavity; and a processor. The processor may be configured to operate in a particulate matter concentration determination mode by determining a particle velocity using the self-mixing signal and operate in an absolute distance mode by determining an absolute distance using the self-mixing signal; when the absolute distance is less than a sensing volume associated with the beam of coherent light, determining a contamination is present on an optically transparent material; and when the absolute distance is greater than the sensing volume, determining an obstruction is present in the beam of coherent light.

In some examples, the absolute distance may be a first absolute distance and the processor may determine a second absolute distance after determining the contamination or the obstruction. In various examples, the processor may output a notification to clean the optically transparent material after determining the contamination is present. In some such examples, the absolute distance may be a first absolute distance, the processor may determine a second absolute distance, and the processor may switch to the particulate matter concentration determination mode when the second absolute distance is within the sensing volume.

In a number of examples, the processor may output a notification to remove the obstruction upon determining the obstruction. In various examples, the processor may switch to the particulate matter concentration determination mode after the obstruction is removed.

As described above and illustrated in the accompanying figures, the present disclosure relates to a wavelength-modulation technique that detects the presence of contamination and/or obstructions that may cause inaccurate particle velocity and/or particulate matter concentration estimation. A portable electronic device is operable in a particulate matter concentration mode where the portable electronic device uses at least one light source to emit at least one beam of coherent light, uses at least one detector to measure a self-mixing signal resulting from a reflection or backscatter of the beam of coherent light, and determines a particle velocity and/or particulate matter concentration using the self-mixing signal. The portable electronic device is also operable in an absolute distance mode where the portable electronic device determines whether or not an absolute distance determined using the self-mixing signal is outside or within a particulate sensing volume associated with the beam of coherent light. If the absolute distance determined is outside the particulate sensing volume, the portable electronic device may determine a contamination and/or obstruction is present, discard and/or re-determine an associated particle velocity and/or particulate matter concentration determination, instruct removal of the contamination and/or obstruction, wait to determine particle velocity and/or particulate matter concentration until the contamination and/or obstruction is gone, and so on. As a result, inaccurate particle velocity and/or particulate matter concentration data may not be reported and/or used.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A portable electronic device that senses particulate matter, comprising:
   a self-mixing interferometry sensor configured to emit a beam of coherent light from an optical resonant cavity, receive a reflection or a backscatter of the beam into the optical resonant cavity, and produce a self-mixing signal resulting from self-mixing of the coherent light within the optical resonant cavity; and
   a processor configured to:
   determine, using the self-mixing signal, an absolute distance to an object causing the reflection or the backscatter of the beam of coherent light; and
   when the absolute distance is within a predetermined sensing volume, determine a particle velocity using the self-mixing signal.

2. The portable electronic device of claim 1, wherein the processor waits a period of time before determining the particle velocity when the absolute distance is outside the predetermined sensing volume.

3. The portable electronic device of claim 1, wherein the processor determines that the particle velocity cannot be determined when the absolute distance is outside the predetermined sensing volume.

4. The portable electronic device of claim 1, wherein the processor:

makes a series of absolute distance determinations when the absolute distance is outside the predetermined sensing volume; and waits until one of the series of absolute distance determinations is within the predetermined sensing volume or cannot be determined before determining the particle velocity.

5. The portable electronic device of claim 1, wherein the processor determines the absolute distance based on a modulation of the beam of coherent light.

6. The portable electronic device of claim 1, when the absolute distance is outside the predetermined sensing volume, the processor determines the particle velocity using the self-mixing signal and signals an inaccuracy in the particle velocity.

7. The portable electronic device of claim 1, wherein the self-mixing interferometry sensor comprises at least one vertical-cavity surface-emitting laser optically coupled with a photodetector.

8. A method, comprising:
emitting a beam of coherent light from an optical resonant cavity of a self-mixing interferometry sensor through at least one optically transparent material via at least one optical element to illuminate an object;
receiving a reflection or a backscatter of the beam of coherent light into the optical resonant cavity;
producing a self-mixing signal resulting from self-mixing of the beam of coherent light within the optical resonant cavity;
determining an absolute distance to the object using the self-mixing signal; and
upon determining that the absolute distance corresponds to an area inside of a sensing volume associated with the beam of coherent light:
determining a particle velocity using the self-mixing signal; and
determining a particulate matter concentration using the particle velocity and a particle count.

9. The method of claim 8, wherein determining the particle velocity uses:
a first self-mixing signal measured from a first beam of coherent light; and
a second self-mixing signal measured from a second beam of coherent light.

10. The method of claim 9, wherein determining the particle velocity uses a known angle between the first beam of coherent light and the second beam of coherent light.

11. The method of claim 9, wherein the self-mixing interferometry sensor comprises a first vertical-cavity surface-emitting laser and a second vertical-cavity surface-emitting laser and the method further comprises:
emitting the first beam of coherent light using the first vertical-cavity surface-emitting laser; and
emitting the second beam of coherent light using the second vertical-cavity surface-emitting laser.

12. The method of claim 9, wherein the self-mixing interferometry sensor is a single vertical-cavity surface-emitting laser and the method further comprises splitting the beam of coherent light into the first beam of coherent light and the second beam of coherent light using the at least one optical element.

13. The method of claim 8, further comprising focusing the beam of coherent light at a location corresponding to the sensing volume using the at least one optical element.

14. The method of claim 8, wherein the absolute distance is a first absolute distance and the method further comprises determining whether or not the particulate matter concentration is accurate by determining whether a second absolute distance corresponds to the area inside of the sensing volume associated with the beam of coherent light.

15. A portable electronic device that senses particulate matter, comprising:
a self-mixing interferometry sensor configured to emit a beam of coherent light from an optical resonant cavity, receive a reflection or a backscatter of the beam into the optical resonant cavity, and produce a self-mixing signal resulting from self-mixing of the coherent light within the optical resonant cavity; and
a processor configured to:
determine an absolute distance using the self-mixing signal;
when the absolute distance is less than a sensing volume associated with the beam of coherent light, determining a contamination is present on an optically transparent material;
when the absolute distance is greater than the sensing volume, determine an obstruction is present in the beam of coherent light; and
when the absolute distance is within the sensing volume, determine a particle velocity using the self-mixing signal.

16. The portable electronic device of claim 15, wherein:
the absolute distance is a first absolute distance; and
the processor determines a second absolute distance after determining the contamination or the obstruction.

17. The portable electronic device of claim 15, wherein the processor outputs a notification to clean the optically transparent material after determining the contamination is present.

18. The portable electronic device of claim 17, wherein:
the absolute distance is a first absolute distance; and
the processor determines a second absolute distance after the optically transparent material is cleaned.

19. The portable electronic device of claim 15, wherein the processor outputs a notification to remove the obstruction upon determining the obstruction.

20. The portable electronic device of claim 19, wherein:
the absolute distance is a first absolute distance; and
the processor determines a second absolute distance after the obstruction is removed.

* * * * *